US012512630B2

(12) United States Patent
Starke et al.

(10) Patent No.: US 12,512,630 B2
(45) Date of Patent: Dec. 30, 2025

(54) SHIELDED ELECTRIC CONNECTOR

(71) Applicant: Phoenix Contact GmbH & Co. KG, Blomberg (DE)

(72) Inventors: Cord Starke, Blomberg (DE); Lukas Brillo, Höxter (DE); Michael Lüdke, Vlotho (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 635 days.

(21) Appl. No.: 17/800,321

(22) PCT Filed: Feb. 18, 2021

(86) PCT No.: PCT/EP2021/053988
§ 371 (c)(1),
(2) Date: Nov. 22, 2022

(87) PCT Pub. No.: WO2021/165377
PCT Pub. Date: Aug. 26, 2021

(65) Prior Publication Data

US 2023/0283022 A1 Sep. 7, 2023

(30) Foreign Application Priority Data

Feb. 21, 2020 (DE) ..................... 10 2020 104 653.7

(51) Int. Cl.
*H01R 13/6589* (2011.01)
*H01R 13/52* (2006.01)

(52) U.S. Cl.
CPC ....... *H01R 13/6589* (2013.01); *H01R 13/521* (2013.01); *H01R 13/5219* (2013.01)

(58) Field of Classification Search
CPC ......................... H01R 13/502; H01R 13/5208; H01R 13/521; H01R 13/5219; H01R 13/622;

(Continued)

(56) References Cited

U.S. PATENT DOCUMENTS 3,322,885 A * 5/1967 May ......................... H01R 4/58 174/76
5,906,513 A * 5/1999 Peterson ............ H01R 13/6593 439/607.58

(Continued)

FOREIGN PATENT DOCUMENTS

CN 110121816 A 8/2019
DE 19613228 A1 10/1997

(Continued)

OTHER PUBLICATIONS

Int. Preliminary Report on Patentability and Written Opinion with English Translation, Int. Application No. PCT/EP2021/053988, Int. Filing Date: Feb. 18, 2021, Applicant: Phoenix Contact GmbH & Co. KG, Date: Aug. 23, 2022.

(Continued)

*Primary Examiner* — Abdullah A Riyami
*Assistant Examiner* — Thang H Nguyen
(74) *Attorney, Agent, or Firm* — Reising Ethington P.C.

(57) ABSTRACT

A shielded electrical connector is provided, comprising a plurality of wire elements, a plurality of wire element sheaths, an outer shielding sleeve, at least one inner shielding sleeve, a connector housing for accommodating terminal members, a shield divider for defining at least two shielding sectors, wherein the first subset of wire elements is extended into a first shielding sector and a second subset of wire elements is extended into a second shielding sector, at least one sealing insert for being arranged in one of the shielding sectors for sealing off a cable side from a connector side in the area of the shield divider, and an electrically conductive shielding bridge for electrically connecting the outer shielding sleeve to the at least one inner shielding sleeve and to the shield divider.

27 Claims, 15 Drawing Sheets

(58) Field of Classification Search
CPC ............ H01R 13/6473; H01R 13/6585; H01R 13/6589; H01R 13/6591; H01R 2107/00; H01R 24/86
See application file for complete search history.

(56) References Cited

U.S. PATENT DOCUMENTS

| | | | | |
|---|---|---|---|---|
| 2007/0259568 A1* | 11/2007 | Mackillop | H01R 13/6477 439/638 |
| 2021/0057853 A1* | 2/2021 | Droesbeke | H01R 4/72 |

FOREIGN PATENT DOCUMENTS

| | | | | |
|---|---|---|---|---|
| DE | 102008018403 | A1 | 10/2009 | |
| DE | 102009021594 | A1 | 10/2010 | |
| DE | 3352311 | * | 7/2018 | H01R 13/434 |
| DE | 102018102253 | A1 | 8/2019 | |
| EP | 0352311 | A1 | 1/1990 | |
| EP | 2355258 | A1 | 8/2011 | |
| EP | 2515387 | A1 | 10/2012 | |
| EP | 3352311 | A1 | 7/2018 | |
| EP | 3566266 | A1 | 11/2019 | |
| FR | 2570551 | A1 | 3/1986 | |
| WO | 2016135170 | A1 | 9/2016 | |

OTHER PUBLICATIONS

Int. Search Report with English Translation, Int. Application No. PCT/EP2021/053988, Int. Filing Date: Feb. 18, 2021 Applicant: Phoenix Contact GmbH & Co. KG, Date: Apr. 21, 2021.
German Office Action, Serial No. 10 2020104653.7, Applicant: Phoenix Contact GmbH & Co. KG, Date: Oct. 21, 2020.
NPL1, International Search Report and Written Opinion, Int. Serial No. PCT/EP2021/053988, Applicant: Phoenix Contact GmbH & Co. KG, Date: Apr. 21, 2021.
NPL2, DE Office Action, Serial No. 10 2020 104 653.7, Applicant: Phoenix Contact GmbH & Co. KG, Date: Oct. 21, 2020.
Chinese Search Report corresponding to application 2021800157097, dated Aug. 21, 2025, 3 pages.
Chinese Office Action corresponding to application 2021800157097, dated Aug. 23, 2025, 3 pages.

* cited by examiner

SHIELDED ELECTRIC CONNECTOR

TECHNICAL FIELD

The present disclosure relates to a shielded electrical connector and to a method for producing a shielded electrical connector.

BACKGROUND

Methods for providing cables with shielding when they are connected to a plug-in connector have already been known. For example, solutions are known which use a crimped sleeve and a union nut, see German Patent DE 196 13 228 B4.

In another variation, such as in U.S. Pat. No. 5,906,513, it is proposed to press a sleeve-shaped housing with tabs onto a metallic braided shielding of a cable and to then overmold it with a thermoplastic material.

From DE 10 2008 018 403 A1, a method is known which uses a shielding that consists of an electrically conductive plastics material.

Document WO 2016 135 170 A1 from the Applicant's company describes a procedure in which a shielding is produced using a metal casting process. The present application can be considered as a further development of the aforementioned patent application, which is why WO 2016 135 170 A1 is incorporated herein by reference.

In addition to the drawbacks of the previously mentioned prior art as already stated in WO 2016 135 170 A1, the previously known methods for shielding connectors sometimes require complex assembly and can exhibit different contact resistances at the contact zones of the shielding, in particular due to temperature and aging of the employed materials.

Moreover, all previously known methods only provide a connection between the outermost shielding sleeve of the cable and the connector.

However, according to the present disclosure, cables can be used in which conductors, i.e. wires, included in the cable can or should have an additional wire shielding. In order to reduce or prevent crosstalk of signals from the various wires into respective other wires, it can be desirable if the wire shielding which shields individual wires or a subset of the wires of the cable from each other, can further or continuously provide the shielding effect in the area of the plug-in connector, so as to prevent any crosstalk between the wires. This has not been intended or possible in the previously known methods.

GENERAL DESCRIPTION OF THE PRESENT DISCLOSURE

The present disclosure is based on the object of providing a shielded electrical connector with a good shielding connection between a shielded electrical cable and a shielded plug-in connector.

A further aspect of the object is to create a durable shielded electrical connector in which contact resistances between the involved shielding components remain low during the service life of the connector.

Thus, the shielded electrical connector is easily manufactured and largely machine producible and comprises as few individual parts as possible in order to further simplify its assembly.

A special focus of the object is to connect such shielded electrical cables with plug-in connectors in which individual or a subset of the wires of the electrical cable have a partial shielding or sub-shielding, so that this partial or sub-shielding can also unfold its effect in the area of the plug-in connector and in particular is also connected to the shielding.

The shielded electrical connector comprises a plurality of wire elements, i.e. at least two wire elements, which form part of a cable or of the plug-in connector. For example, the wire elements form part of an electrical cable and are to be connected to terminal members of a plug-in connector. Or each wire element has a wire element sheath for electrically insulating the respective wire element. The shielded electrical connector therefore comprises a plurality of wire element sheaths, each wire element typically having its own wire element sheath. The plurality of wire element sheaths therefore comprise at least two wire element sheaths. The wire element sheaths may, for example, consist of a plastic sheath, a rubber sheath, or any other type of wire insulation. A heat-shrink tube or a wire element sheath that is subsequently applied during assembly of the plug-in connector can also be considered.

Furthermore, an outer shielding sleeve is provided, which surrounds the plurality of wire elements at least partially or at least in sections thereof. The outer shielding sleeve completely encloses the wire elements over the entire length of the non-stripped cable, i.e. continuously from a first end of the cable to a second end of the cable. Thus, a shielding effect can be achieved along the entire cable by the outer shielding sleeve, and in a preferred embodiment the shielding sleeve can also be grounded at least at one end of the cable at the plug-in connector or connectors, for example on a contact ring of a housing part. In other words, the outer shielding sleeve jointly surrounds all wire elements, so that the wire elements all together are arranged inside of the outer shielding sleeve and are shielded from the environment by the outer shielding sleeve.

In the area where the cable is connected to the plug-in connector, the outer shielding sleeve is exposed in order to access the wire elements for electrically connecting them to terminal members. The exposing is preferably done by machine, so that in each case a consistent annular portion of the outer shielding sleeve is exposed, for example at one end of the cable.

Furthermore, at least one inner shielding sleeve is provided, which jointly surrounds a subset of the wire elements at least partially or at least around portions thereof, for shielding them from the other wire elements. For example, the wire elements can be combined in pairs and a respective inner shielding sleeve can be provided around each pair. In one example, the cable comprises a total of eight wire elements, and inner shielding sleeves surround respective pairs thereof, so that in this example four inner shielding sleeves are included, all of which are jointly surrounded by the outer shielding sleeve. The subset of wire elements comprises at least one wire element, or two wire elements. The subsets may include a different number of wire elements. It is preferred and intended that a wire element is only assigned to exactly one subset. In a cable that includes different wire elements, it may be intended that only the subset of wire elements is provided with the inner shielding, for example in order to additionally shield current-carrying wires from signal-carrying wires in a common cable. In a preferred case, a first subset of wire elements, for example signal-carrying ones, is enclosed by a first inner shielding sleeve, and a second subset of wire elements, for example signal-carrying ones as well, is separately enclosed by a second inner shielding sleeve.

Furthermore, a connector housing is provided, in which the plurality of wire elements can be electrically connected, in particular to terminal members. Typically, the connector housing also has a plug-in face for being connected to a further cable part or for electrically connecting the wire elements to a further assembly.

The shielded electrical connector furthermore comprises a shield divider which defines at least two shielding sectors. For example, the shield divider has at least two shielding webs, and the radial area between two shielding webs defines a respective shielding sector. At least one wire element can be extended through a shielding sector. Preferably, one of the subsets of wire elements is extended through a shielding sector, namely a subset in which the individual wire elements of this subset do not need to be shielded from one another, but only from the other wire elements of the cable.

Furthermore, at least one sealing insert is provided for sealing off a cable side from a connector or plug-in side in the area of the shield divider. In other words, the sealing inserts are provided in order to provide a fluid-tight barrier, so that fluid exchange can no longer occur from the cable side to the plug-in connector side and/or vice versa. In other words, the sealing insert or the sealing inserts provide a fluid barrier in the axial direction, so that fluid exchange is inhibited between the plug-in side and the cable side. Thus, the sealing inserts also ensure that no liquid material can penetrate to the plug-in side and thus into the connector from the cable side.

The wire elements are either extended through the sealing inserts, or the sealing inserts are applied onto the respective wire element(s), for example by being injection molded thereto or overmolded in a molding process. For example, a plurality of sealing inserts are provided for being arranged or inserted in or injection molded or casted into a respective shielding sector, in particular one sealing insert in each shielding sector.

Furthermore, an electrically conductive shielding bridge is provided, for electrically connecting, in particular in a non-releasable or non-detachable manner, the outer shielding sleeve to at least the inner shielding sleeve(s) and the shield divider. In other words, the electrically conductive shielding bridge or shielding insert provides an electrical bridge which connects the outer shielding sleeve to the inner shielding sleeves and to the shield divider with the lowest possible electrical resistance.

The electrically conductive shielding insert or electrically conductive shielding bridge can create a non-releasable connection between the outer shielding sleeve, the inner shielding sleeves and also the shield divider as far as to the connector housing, and preferably the electrically conductive shielding bridge is provided around the wire element sleeves as a one-piece component, i.e. integrally. Particularly preferably, the electrically conductive shielding bridge can enclose the wire element sheaths radially all around. This means that the electrically conductive shielding bridge is also provided between the wire elements. In other words, the shielding bridge ensures that the inner shielding sleeves are also electrically connected to the shield divider and to the outer shielding sleeve, so that the inner shielding effect or shielding between the wires is also maintained, in particular completely and/or without gap. In other words, the electrically conductive shielding bridge is able to provide an electrical shielding effect, in particular without interruption, from the cable via the exposed areas of the cable in the vicinity of the connector housing and through the shield divider to the connector housing, while also maintaining the inner shielding effect between the subsets of wire elements, in particular without interruption.

If the wire elements are each separately provided with wire element sheaths, the electrically conductive shielding bridge is arranged between each wire element, that is to say between all wire elements. In other words, the electrically conductive shielding bridge encloses each wire element individually radially all around. In the case where a subset of wire elements has a common second wire element sleeve, for example in the form of a heat-shrink tube, which is applied around a pair of wire elements, for example, the electrically conductive shielding bridge will also enclose all wire element sleeves radially all around, while an intermediate space between the pair of wire elements optionally remains free of the electrically conductive shielding bridge. In other words, in this case the interior of the second wire element sheath will not be filled by the electrically conductive shielding bridge, rather is arranged around the respective second wire element sheaths. In this case, the electrically conductive shielding bridge surrounds the pair of two wire elements that have a second wire element sheath and thus also radially surrounds each wire element from all sides.

In other words, for example, each wire element has a separate wire element sheath, that is in particular a wire insulation. The electrically conductive shielding bridge is then introduced in such a way that the shielding bridge surrounds the wire elements all around, i.e. in particular surrounds each individual wire element radially from all sides, and thus preferably extends between the individual wire elements, which means it flows between the wire elements in the liquid state, for example, and is distributed there so that an integral component in the form of an electrically conductive shielding bridge is produced. The wire element sheaths are designed to withstand the thermal stress when the shielding bridge is applied, so that no electrical connection is created between the wire elements and the shielding bridge. For example, the wire element sheaths are adapted so as to not melt when the electrically conductive shielding bridge is applied, so that no short circuit is produced between any of the wire elements and the shielding bridge. An electrical connection between the wire elements and the electrically conductive shielding bridge is therefore not intended nor provided in the area where the shielding bridge is applied. Optionally, in a special embodiment, one of the wire elements, in particular a ground wire, can be electrically connected to the shielding bridge inside the plug-in connector; this should not be excluded hereby. However, in the preferred case there is no electrical connection between the wire elements and the shielding bridge, rather the shielding bridge provides electrical shielding of the wire elements from one another and also electrical shielding of the wire elements from the environment.

The electrically conductive shielding bridge is thus arranged around the wire elements and also between the wire elements and forms an integral, i.e. monolithic component in the form of a shielding bridge. As a continuous component, the one-piece, i.e. monolithic, electrically conductive shielding connects the outer shielding sleeve to the inner shielding sleeve(s) and to the shield divider, directly and immediately. This creates a solid and reliable electrical connection between the three aforementioned components, namely the outer shielding sleeve, the inner shielding sleeve (s), and the shield divider, which can be provided by the shielding bridge in particular in an uninterrupted manner between and around the wire elements. Here, the reliable electrical connection of all the aforementioned components to one another can ensure a simplification of the manufacturing process, since the electrical connection might optionally no longer have to be checked. The integral component in the form of the shielding bridge, which electrically connects all of the aforementioned components to one another in particular in a firm and fused way, can optionally have a lower electrical resistance in comparison to a multi-part shielding. Also, a multi-part electrical shielding may require further processing steps in the manufacturing. On the other hand, the in particular uninterrupted shielding of the shielding bridge can improve signal quality and/or reduce signal attenuation, especially in radio-frequency applications (i.e. in RF technology) and/or when used where external interference fields are expected.

Hence, a special feature that can be implemented with the shielding bridge of the present disclosure is that the outer shielding (in particular of the cable), the inner shielding(s) (in particular of two wire elements in each case) and the shield divider are electrically connected to each other monolithically. This avoids, reduces, or prevents potential defects in the shielding. In contrast to a potentially multi-part shielding bridge, there are no longer any "jump sites", in which case a gapless bond also depends on the adherence to the intermediate portion in the connection, for example, and on the possibility of providing a shielding bridge without gaps in the first place in such a case. In the case of a multi-part shielding bridge, the various parts might become detached from one another during utilization, for example in the event of vibrations during operation or in the event of an impact, such that only an insufficient connection or an interrupting contact can be established as the shielding effect. Such problems can be eliminated or improved with the monolithic shielding bridge presented here. The electrical connection between the three shielding elements (outer shielding, inner shielding(s), shield divider) is thus ensured or improved due to the monolithic structure of the shielding bridge, and at the same time the wire elements can be shielded all around and completely in the area in which the shielding bridge is provided.

It can also be contemplated for the wire elements to be stripped over an elongated portion, for example axially beyond the shielding sectors towards the cable, and to first apply a cover onto the stripped ends of the wire elements, for example of an injection molded plastic material. The electrically conductive shielding insert can also be applied around this cover.

Preferably, the wire elements are only stripped up to the sealing elements, so that the wire element sheaths stay intact in particular in the area in which the electrically conductive shielding bridge is overmolded, and the shielding bridge is therefore overmolded directly onto the wire element sheaths, for example. Thus, the material of the shielding bridge also gets between the subsets of wire elements, preferably between the individual wire elements.

With regard to the shielding effect, it can be irrelevant whether the wire elements arranged together in a pair or in a subset are not shielded from one another by the electrically conductive shielding bridge, rather, the shielding purpose can already be achieved if the second wire element sheath which surrounds the pair of wire elements is radially surrounded all around by the electrically conductive shielding bridge. Preferably, all wire element sheaths are surrounded radially from all sides by the electrically conductive shielding bridge, in particular in direct contact with the electrically conductive shielding bridge, so that the electrically conductive shielding bridge is overmolded directly around the wire element sheaths and/or the second wire element sheaths.

Since the electrically conductive shielding bridge establishes a non-releasable bond between the outer shielding sleeve and the inner shielding sleeves and the shield divider, the electrically conductive shielding bridge is also capable of accommodating mechanical forces between the outer shielding sleeve on the one hand and the shield divider on the other, in particular tensile forces. The electrically conductive shielding bridge is preferably connected to the outer shielding sleeve, the inner shielding sleeves, and the shield divider by a material bond. In this case, the electrically conductive shielding bridge in particular provides uninterrupted shielding and mechanical anchoring of the cable on the plug-in connector.

The wire elements either form part of a cable or of a plug-in connector or preferably electrically connect a cable with a plug-in connector.

The wire elements are preferably provided in pairs of at least two wire elements per pair, and the inner shielding sleeves are adapted for shielding pairs of the wire elements from each other.

The electrically conductive shielding bridge preferably establishes a material bond to the outer shielding sleeve, to the inner shielding sleeves, and to the shield divider, so that a material bond is formed from the shielding sleeves to the shield divider by the electrically conductive shielding bridge.

The shielding bridge preferably also extends between the wire elements, and preferably the shielding bridge also seals the area between the wire elements, so that the individual wire elements are surrounded by the shielding from all sides.

The shielding bridge is preferably made of a metallic material. In this case, the shielding bridge can be overmolded around the wire element sheaths by a metal casting process. The shielding bridge is preferably cast in situ around the wire element sheaths and between the wire elements, so that it radially encloses the wire elements from all sides, in particular in a annular portion of the cable length. In other words, the shielding bridge can be introduced around and between the wire element sheaths and thus around and between the wire elements without gaps, i.e. in an uninterrupted manner, for example it can be in situ molded around the partially assembled plug-in connector using a metal casting process in order to provide uninterrupted shielding of the plug-in connector.

The shielding bridge is preferably adapted to anchor the inner shielding sleeves and the outer shielding sleeve on the shield divider. In other words, the shielding bridge also provides for dissipating a force acting from the side of the cable on the plug-in connector and vice versa. The shielding bridge thus not only enhances the shielding effect of the cable, but also provides strain relief or improves the strain relief effect of the cable on the connector.

The shield divider is electrically connected to the connector housing, in particular it is made integrally with the connector housing. For example, the connector housing is made of a metallic material such as die-cast zinc, and the shield divider is made integrally with the connector housing by a die-casting process.

The shielding bridge is preferably made of a low-melting metallic material, in particular of a metal alloy such as a tin solder. If the shielding bridge melts at a low temperature, the heat impact or introduction of heat to the wire element sheaths will be lower, so that the wire element sheaths do not melt and the electrical insulation between the wire elements and the shielding bridge is retained.

The shielding bridge can also be made of an electrically conductive plastics material or another electrically conductive material in order to achieve the shielding effect. The electrically conductive plastics material can also produce a non-releasable connection between the outer shielding sleeve, the inner shielding sleeve(s), and the shield divider, for example through an adhesive effect. Finally, the shielding bridge may also be adapted for being attached to the outer shielding sleeve, the inner shielding sleeves, and the shield divider for example by being crimped or soldered thereto, in order to establish the electrical and in particular non-releasable connection therebetween.

In order to improve the thermal insulation of the wire element or in particular of the wire element sleeves and optionally to provide for improved electrical insulation between the wire elements and the shielding bridge and/or for improved RF properties, second wire element sleeves can be provided which jointly enclose at least two wire elements, and the electrically conductive shielding bridge encloses the second wire element sheaths in particular radially from all sides. In other words, a further sleeve is provided around the wire element sheaths, for example in the form of heat-shrink tube or a suitable plastics material which can also be overmolded, for example, in order to protect the wire element sleeves even better against the thermal impact of the liquid shielding bridge during the making of the shielding bridge.

The shield divider preferably has at least four shielding webs which are arranged at equal angular distances to one another. More particularly, these four shielding webs of the shield divider are arranged at approximately right angles to one another.

Preferably, a respective subset or a pair of two wire elements is extended through each shielding sector, so that the shield divider shields the subsets of wire elements from one another, and each shielding web of the shield divider is electrically and non-detachably connected to the shielding bridge, i.e. in particular by a material bond.

The shield divider may comprise an inner hollow element, for example for increasing stability or for reducing the amount of material required for producing the plug-in connector or the shield divider.

Preferably, a coding means can be provided in the hollow element of the shield divider, the coding means indicating the correct orientation of the wire elements in the connector. In other words, a simple coding lug, for example, can indicate to the installer the orientation in which the connector housing has to be arranged relative to the cables. For example, the wire element sheath of each wire element may have a specific color, so that the correct assembly with the correct position of the wire elements or plug-in terminals is facilitated in a simple manner by color coding in combination with the coding means. During assembly, it is no longer necessary to pay attention to the mating face, since by virtue of the coding means the information about the orientation of the connector housing is already available on the rear side of the plug-in connector during assembly, that is where the wire elements are introduced into the connector housing, so that the installation of the wire elements in the connector housing can be accomplished free of errors in the correct orientation.

The sealing inserts allow to fluid-tightly seal the side from which the cable is extended to the connector housing, i.e. the cable side, from the interior of the connector housing, i.e. the connector side. The sealing inserts are adapted to preferably seal off each shielding sector separately. Therefore, a plurality of sealing inserts are preferably arranged radially around the shield divider, so that one sealing insert is arranged in each shielding sector, for example, and each sealing insert seals one shielding sector in a fluid-tight manner.

These sealing inserts are desirable, as is the case in an example of the present disclosure, if the shielding bridge is applied to and introduced into the connector and the cable in a melted liquid state, for predefining the extent of the shielding bridge towards a connector housing. The molten material of the shielding bridge preferably flows as far as to the respective sealing insert, but not beyond. At the same time, the sealing insert can be adapted so as to effectively prevent an electrical contact between the shielding bridge and the wire element even in the area where the wire element has been stripped of its insulation. For this purpose, the wire element can be inserted into the sealing insert to such an extent that the stripped portion is completely covered by the sealing insert.

The connector housing may furthermore comprise a radial shielding which at least partially encloses the shield divider on the outside.

The sealing inserts may be arranged between the shield divider and the radial shielding thereby electrically and optionally fluid-tightly insulating the cable side from the connector side in an annular portion. In other words, the shield divider and the radial shielding together can form a type of pocket in each shielding sector, into which the respective sealing inserts are introduced at least partially. The sealing inserts can therefore be inserted into or filled into the pocket formed in the respective shielding sector.

The sealing inserts may be made of plastics material. A sealing insert may have passage openings for extending or passing therethrough the wire ends of the wire elements or the terminal members. The sealing insert may, for example, have one, two, or more than two of such passage openings. Appropriately, a sealing insert has as many passage openings as wire elements are to be extended into a shielding sector, in order to improve the sealing effect. Sealing inserts can also be made of potting compound which is cast in situ around at least two of the wire elements in each case in order to seal the cable side from the connector side. The potting compound may be epoxy resin or an adhesive material.

The sealing inserts may be produced using a shaping process, so that a plastic part is already produced in a mold such as a compression mold before being installed in the connector and is then inserted into the connector. For example, the sealing insert can be achieved by pressing or squeezing the wire element sheaths into the respective shielding sector so that the wire element sheaths seal the respective shielding sector and provide a tight or fluid-tight seal between the cable side and the connector side.

Furthermore, according to the present disclosure, a method is provided for producing a shielded electrical connector. The method comprises the steps of:

- exposing the outer shielding sleeve, the inner shielding sleeves and the wire element sheaths at one cable end;
- connecting each one of the wire elements with a respective terminal member;
- arranging the wire elements and/or the terminal members in pairs as a pair of wires in a respective shielding sector of the shield divider;
- attaching or applying the sealing inserts to or around each wire pair in the area of the shield divider;
- applying the electrically conductive shielding bridge onto and between the wire elements and thereby non-detachably connecting the exposed shielding sleeve, the exposed inner shielding sleeves, and the shield divider to the electrically conductive shielding bridge.

It can also be intended according to the method to introduce the shielding bridge on and radially all around the wire element sheaths of the wire elements.

Furthermore, it can be contemplated that the shielding bridge is made from liquid metal which is cast in situ onto and between the wire elements and in situ solidifies to form the shielding bridge.

The non-detachable connection can be a material bond, in particular in the form of a soldered connection.

Furthermore, the step of introducing the electrically conductive shielding bridge may comprise placing the wire elements with terminal members in a casting mold, closing the casting mold and filling the casting mold with liquid metallic material in order to in situ produce the shielding bridge around and between the wire elements of the shielded electrical connector.

The present disclosure will now be explained in more detail by way of embodiments and with reference to the figures in which identical and similar elements are partially denoted by the same reference numerals, while the features of the various embodiments can be combined with one another.

DETAILED DESCRIPTION OF THE PRESENT DISCLOSURE

Figure 1:
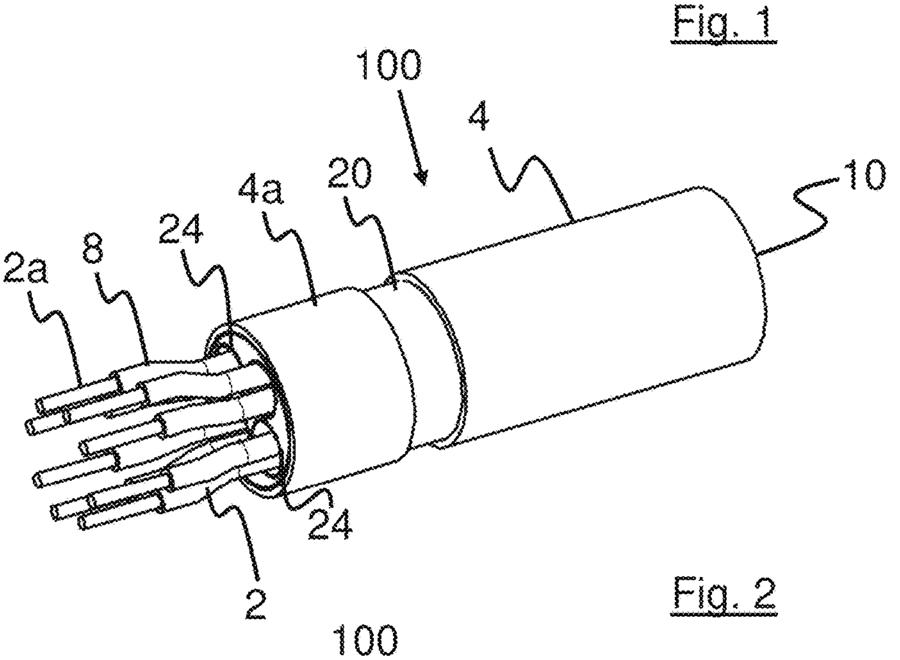
FIG. 1 is a perspective view of a cable comprising a plurality of connecting elements.

FIGS. 1 to 6 show a first variant of sub-steps for making a cable connector 100. First, FIG. 1 shows a cable end 10 where the ends 2*a* of wire elements 2 have been stripped. Cable 10 has a cable jacket or cable insulation 4 which provides protection against accidental contact and makes the cable 10 easy to handle. The cable jacket 4 has been stripped within an annular portion where the outer shielding sleeve 20 is exposed. For example, the outer shielding sleeve 20 is in the form of a braided wire. Adjacent thereto, a portion 4*a* of the cable jacket is remaining around the wire elements 2.

The wire elements are combined in pairs and have inner shielding sleeves 24 for each pair of wire elements 2. Moreover, each of the wire elements 2 is provided with a wire element sheath 8. The wire element sheath 8 provides the electrical insulation for the wire element 2 from its surroundings, i.e. in particular from the other wire elements 2. Accordingly, the wire element sheath 8 of each wire element 2 typically extends through the entire cable 10 and is only stripped at the ends thereof, as shown in FIG. 1.

Figure 2:
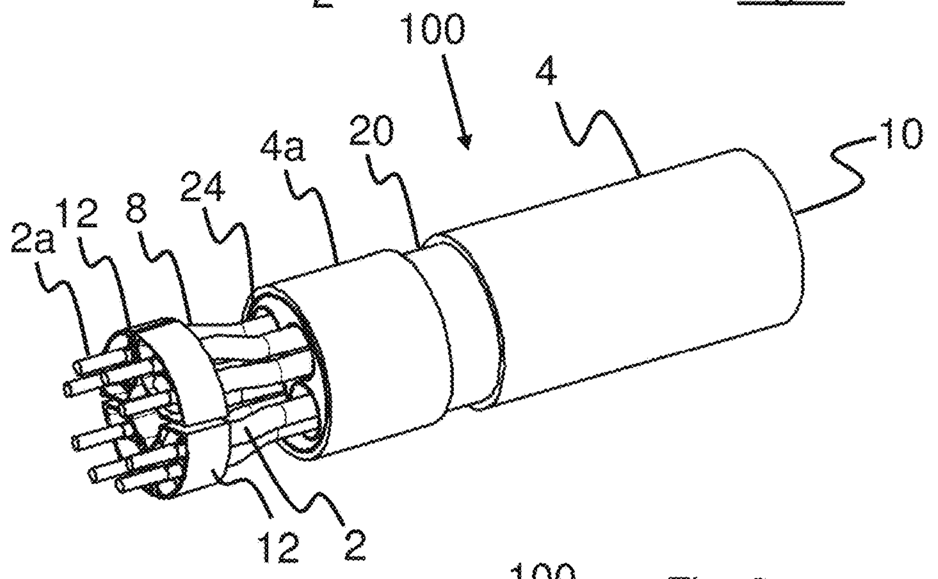
FIG. 2 is a perspective view of a cable comprising a plurality of connecting elements with sealing inserts attached.

As shown in FIG. 2, sealing inserts 12 are fitted onto the stripped ends 2*a* of the wire elements 2. The sealing inserts 12 have a cable side facing towards the inserted cable, and a connector side facing towards the later connector. Typically, the wire elements are extended through the sealing insert 12 from the cable side. It is also possible to first fit the terminal members 14 to the wire ends 2*a* and then the sealing inserts 12.

In the example of FIG. 2, each sealing insert 12 has two passage openings, so that two wire elements 2 can be introduced into each sealing insert 12. For example, the sealing inserts 12 are slid onto the stripped conductor ends 2*a* until abutting at the wire element sheaths 8 or so that the sealing inserts 12 partially overlap with the wire element sheaths 8. In other words, each sealing insert 12 provides sealing in cooperation with the wire element sheaths 8. In the present example, four sealing inserts 12 are threaded onto the eight wire elements 2 shown, each in pairs, resulting in an annular arrangement of the four sealing inserts 12 on the stripped conductor end 2*a*.

Figure 3:
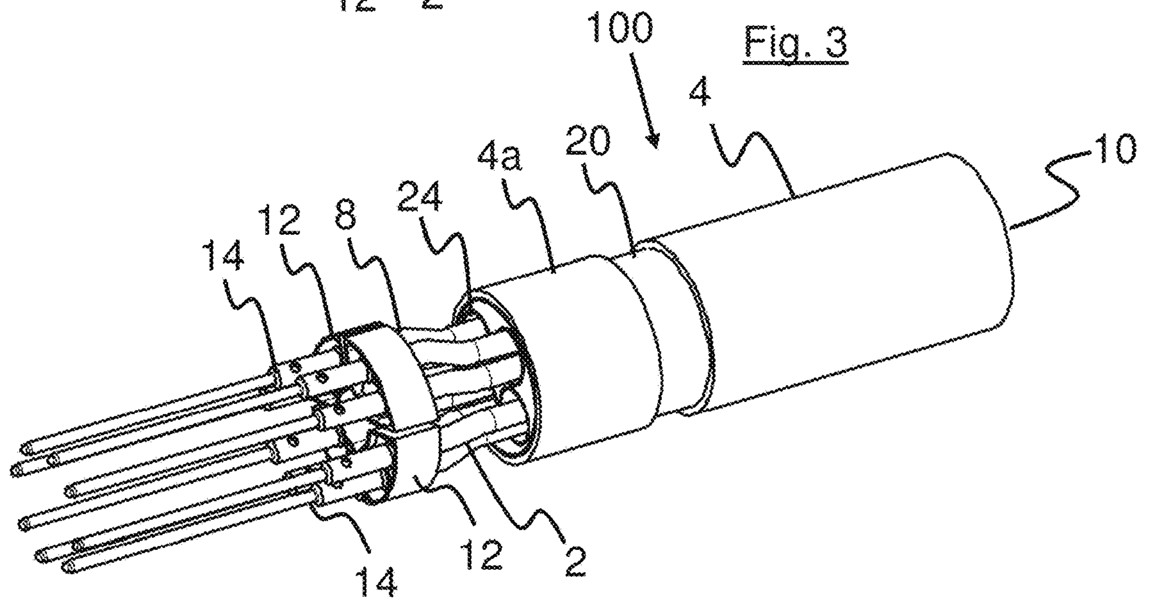
FIG. 3 is a perspective view of a cable comprising a plurality of wire elements and terminal members attached thereto.
Figure 4:
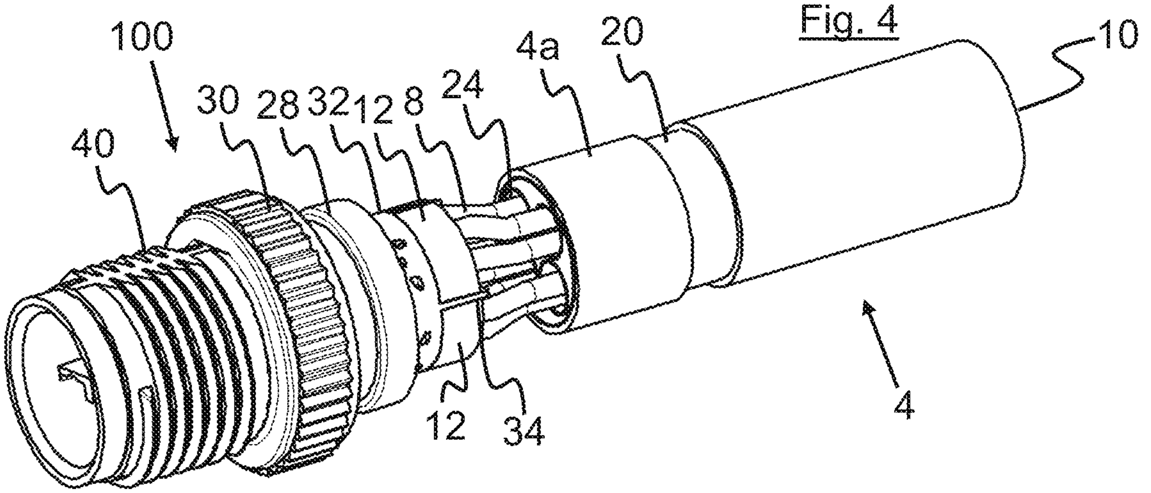
FIG. 4 shows the cable of FIG. 3 with a connector housing.

As shown in FIG. 3, terminal members 14 are then fitted to the stripped conductor ends 2*a* and mechanically connected to the stripped conductor ends 2*a*, for example crimped or soldered thereto, or the like. The sealing inserts 12 are then fixed on the wire elements 2 from both sides, for example with the wire element sheaths 8 abutting on the sealing inserts 12 from the cable side, and with the terminal members 14 abutting on the sealing inserts 12 from the housing side. The sealing inserts 12 can also be fixed on the wire elements 2, with the sealing inserts 12 being fitted partially on the wire element sheaths 8 and initially being fixed in terms of their position by being clamped on the wire element sheaths 8, for example. It may be sufficient for the sealing inserts 12 to initially only be retained in their position adequately or provisionally, i.e. clamped, for example, since final and more stable positional fixing of the sealing inserts 12 may be accomplished only when the shielding bridge 25 is overmolded later, for example.

Subsequently to FIG. 3, the housing part 30 can be fitted to the terminal members 14. In other words, the terminal members 14 are introduced into the housing part 30. The sealing inserts 12 will thereby engage in the shield divider 35, specifically one respective sealing insert 12 in each shielding sector 33. The shield divider 35 comprises a plurality of shielding webs 34, each pair of shielding webs 34 defining a shielding sector 33 therebetween. A shielding sector 33 thus defines an accommodation area for a respective sealing insert 12, so to speak.

The shield divider 35 furthermore comprises a radial ring 32, and the sealing inserts 12 partially engage below the radial ring 32 so as to seal off the respective shielding sector 33 together with the radial ring 32 in a media-tight manner.

Figure 5:
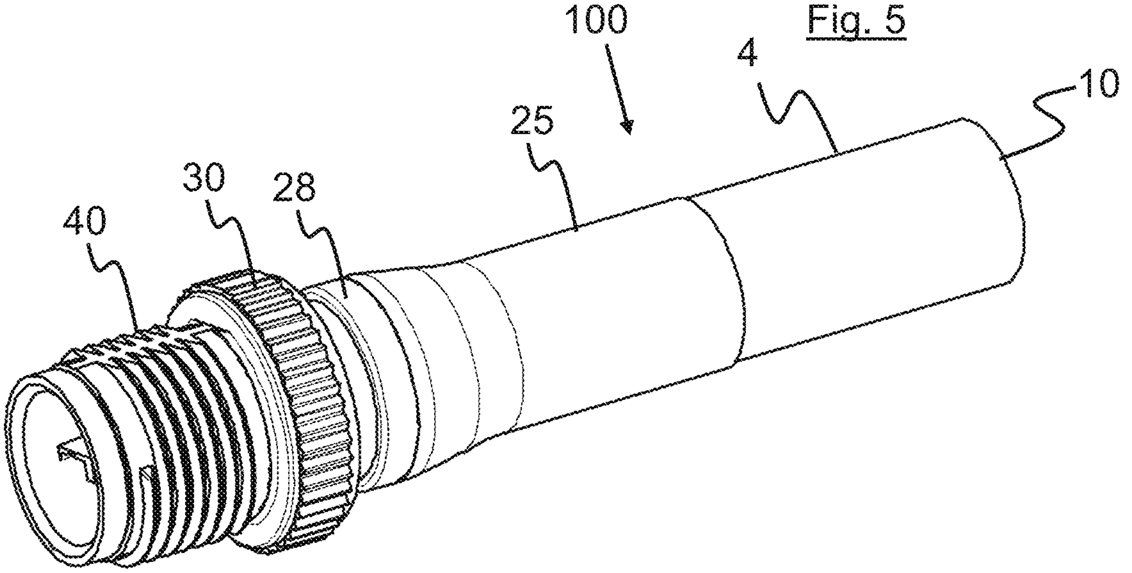
FIG. 5 shows the cable of FIG. 4 with overmolded shielding bridge.
Figure 7:
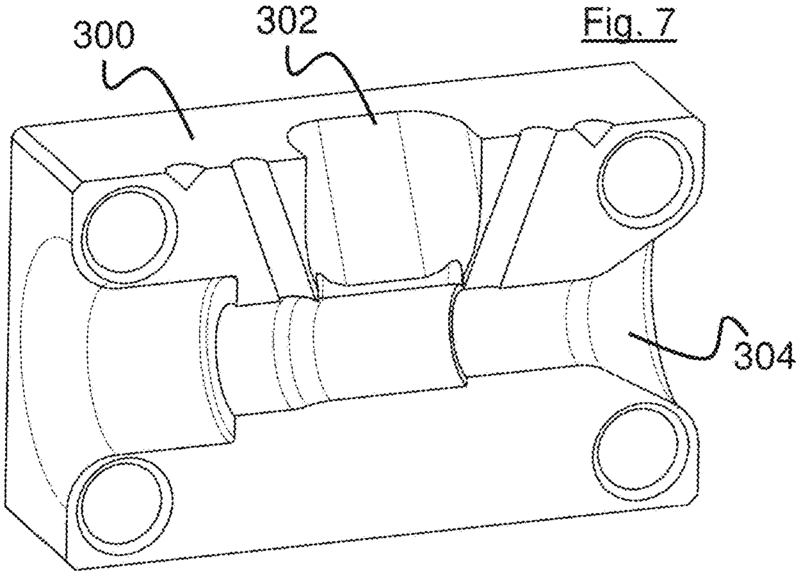
FIG. 7 shows a casting mold for producing the shielding bridge.
Figure 8:
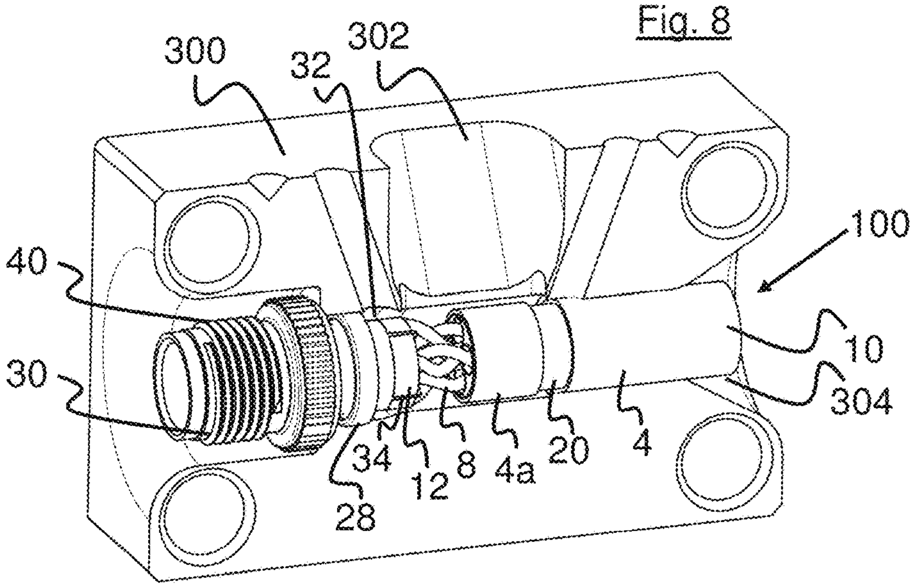
FIG. 8 shows the casting mold of FIG. 7 with the connector placed therein.
Figure 9:
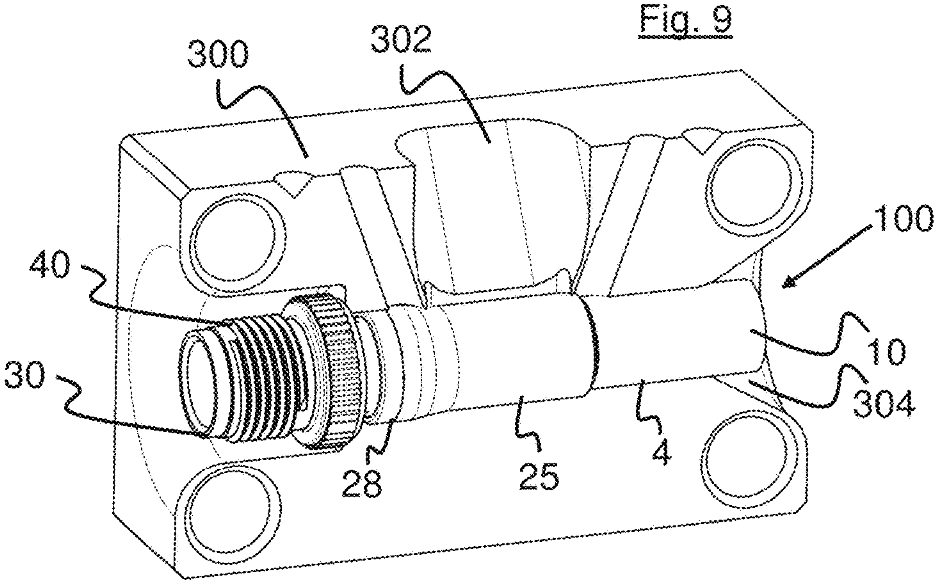
FIG. 9 shows the casting mold with the connector placed therein and with the overmolded shielding bridge.

Subsequently, as shown in FIGS. 7 to 9, for example, the shielding bridge 25 can be applied around the wire element sheaths 8 of the wire elements 2 that are still exposed. In this way, a shielding bridge 25 is formed, as shown in FIG. 5, which joins the outer shielding sleeve 20, the inner shielding sleeves 24, and the housing part 30 to one another in an electrically conductive and non-releasable manner, in particular by a material bond.

Figure 6:
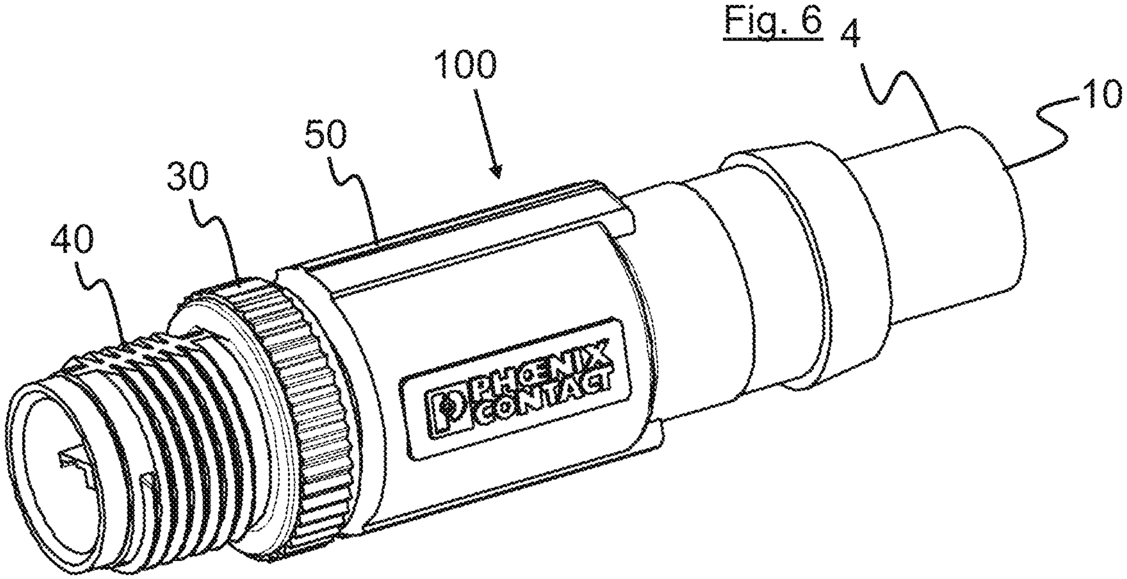
FIG. 6 shows the cable of FIG. 5 with a plastic jacket applied thereto.

As illustrated by FIG. 6, a flexible jacket 50 is then applied to the connector 100, for example for sealing and strain relief purposes, but also for aesthetic reasons and moreover in order to provide protection against accidental contact. Thus, the commercial form of the connector 100 is finally obtained.

FIGS. 7 to 9 show the making of the shielding bridge 25 in a casting mold 300. First, FIG. 7 shows the empty casting mold 300 which has a filling opening for the material used to produce the shielding bridge 25, for example a low-melting metal alloy. Furthermore, the casting mold 300 has a connector receiving opening 304 in which the connector 100 can be placed. Typically, the casting mold 300 will consist of two halves which can be mated with one another and locked, while each of FIGS. 7 to 9 only show one half of the casting mold, for better comprehension of the structure thereof.

FIG. 8 shows the casting mold 300 with the connector 100 placed therein. Here, the portion to be overmolded is exposed, and the shielding bridge is to be cast onto, i.e. overmolded around the exposed wire element sheaths 8, the sealing inserts 12, the shield divider 35, and the outer shielding sleeve 20.

FIG. 9 shows the casting mold 300 with the connector 100 placed therein, including the shielding bridge 25 that has been completely cast and has solidified and cooled down. With the shielding bridge 25, the electrical connection between the housing part 30 and the outer shielding sleeve 20 and the inner shielding sleeve 24 has been completed.

Figure 10:
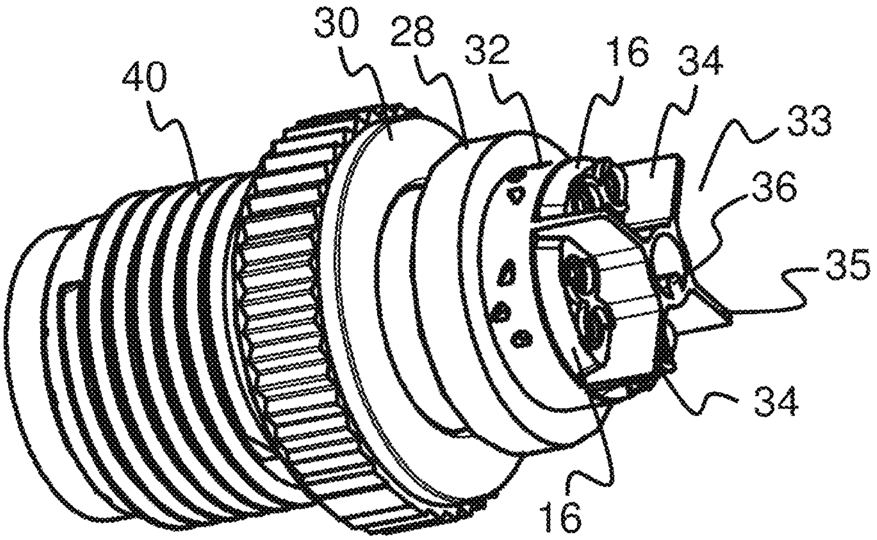
FIG. 10 is a perspective view of a connector housing.

FIG. 10 shows a detailed view of a housing part 30 comprising a sealing ring 28, the shield divider 35 including the radial ring 32 and the shielding webs 34. Sealing ring 28 in particular serves as a seal in the casting mold when casting the still liquid shielding bridge 25, i.e. in particular for the liquid metal. On the later finished plug-in connector 100, it can moreover be useful in combination with the final overmold, i.e. the flexible jacket 50, as a sealing element against the ingress of moisture. The ends of terminal sleeves 16 are introduced into the shielding sectors 33, each terminal sleeve 16 having two passage openings 161, 162 (see FIG. 13). Sealing inserts 12 are installed in the remaining areas of the shielding sectors 33, see FIG. 18. Finally, the housing part 30 has a screw thread 40 in order to connect the housing part 30 with a further connecting part.

Shield divider 35 has an inner hollow portion 38 in which a coding lug 36 is provided. The coding lug 36 indicates the correct orientation for connection of the wire elements 2 to the respective shielding sectors 33 of the housing part 30.

Figure 11:
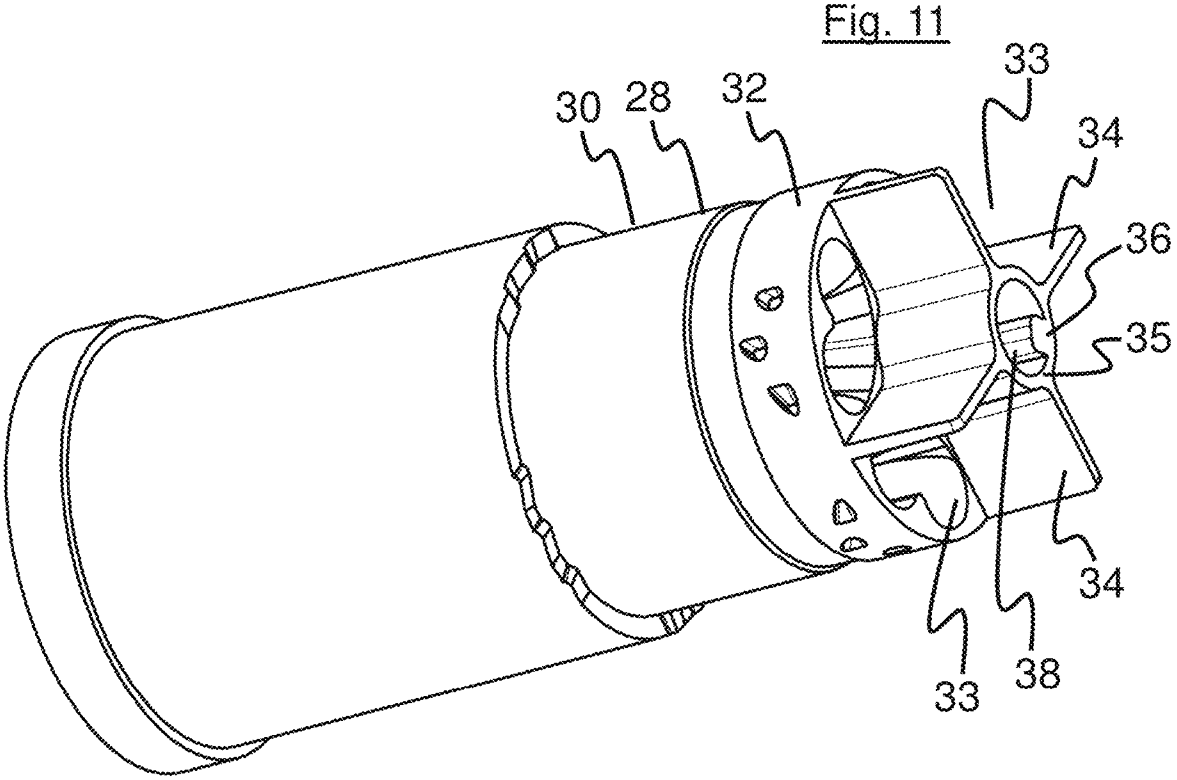
FIG. 11 is a perspective view of an alternative embodiment of a connector housing.

FIG. 11 shows a housing part 30 with a shield divider 35 and four shielding webs 34. In this example, no terminal sleeves 60 are provided or required. This type of housing part 30 can be provided, for example, if an internal thread or a connection means other than the screw thread 40 is to be provided on the distal end of the housing part 30. For example, the embodiment of FIG. 11 shows a detail of FIG. 10.

Figure 12:
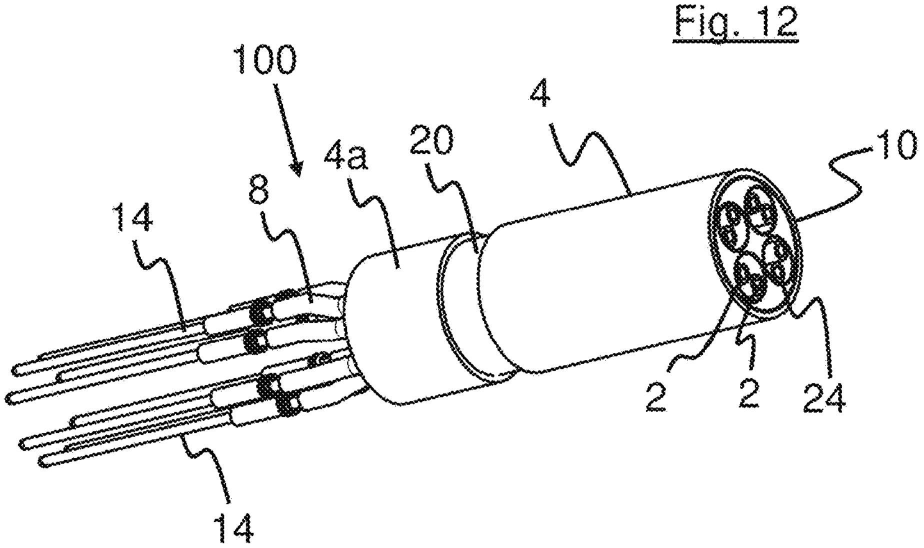
FIG. 12 is a perspective view of a connector with a plurality of wire elements and terminal members attached thereto.

FIG. 12 shows a further plug-in connector 100 in a partially assembled state, with the end of cable 10 stripped of the cable insulation 4 and the conductor ends 2 exposed. In any case, electrical contact can be established to the outer shielding sleeve 20 between the insulation 4 and the portion 4*a* of the cable insulation, but also at the end portion of cable insulation 4. The stripped wire ends 2*a* (see FIG. 1, for example) have already been equipped with the terminal members 14, which are fitted so as to abut on the wire element sheaths 8 or are mounted such that a small exposed area of the wire elements 2 remains between the terminal members 14 and the wire element sheaths 8.

A terminal sleeve 16 can be slid onto the terminal members 14, each of which is able to accommodate a pair of two terminal members 14. The terminal sleeve 16 is fitted on the terminal members 14 by introducing the terminal members 14 into the passage openings 161, 162 and approaching the terminal sleeve 16 until it abuts on the wire element sheaths 8. For better insulation, the terminal sleeve 16 furthermore has an insulating collar 163 between the two passage openings 161, 162. Finally, the sleeve extension 164 of terminal sleeve 16 also covers a major portion of the terminal members 14.

Figure 13:
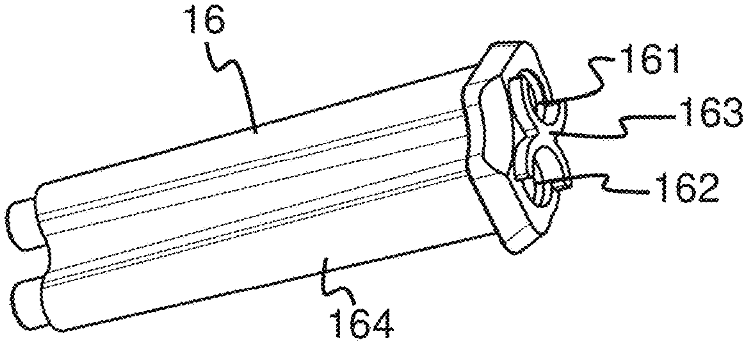
FIG. 13 is a perspective view of a terminal sleeve.
Figure 14:
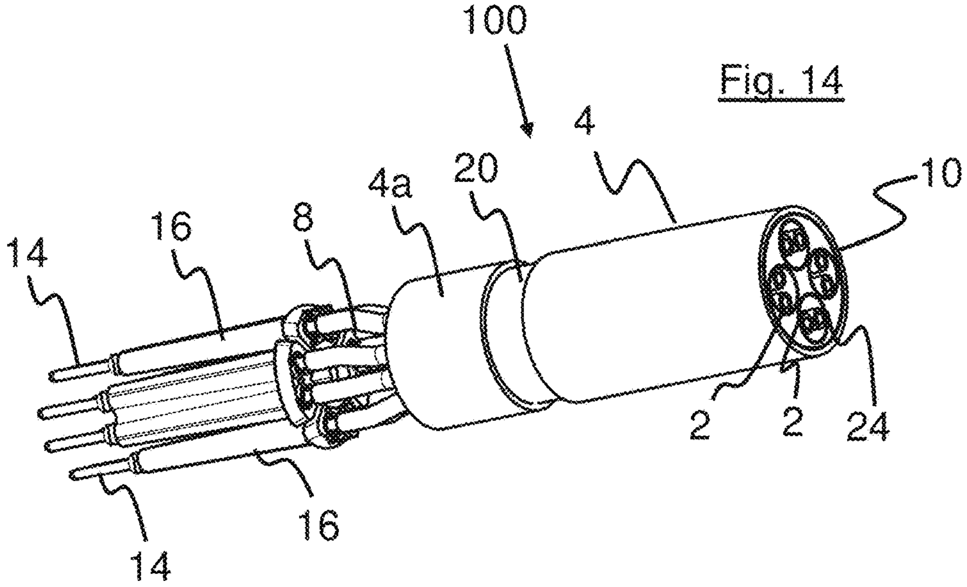
FIG. 14 shows the connector of FIG. 12 with terminal sleeves.

FIG. 14 shows the plug-in connector 30 equipped with the terminal sleeves 16 illustrated in FIG. 13 in a partially assembled state, with two respective wire elements 2 inserted in each respective terminal sleeve 16. Since the cable 10 of the example of FIG. 14 has eight wire elements 2, four terminal sleeves 16 are provided, with two wire elements 2 inserted into each one thereof.

Figure 15:
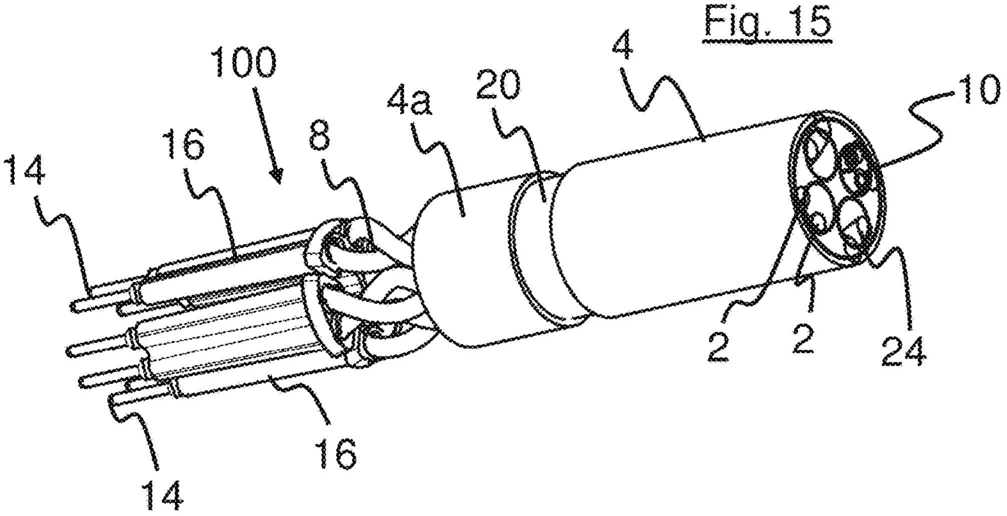
FIG. 15 shows an alternative embodiment of a connector with crossed wire elements.

FIG. 15 shows an alternative embodiment to that of FIG. 14, in which the wire elements 2 are twisted or overcrossing one another in pairs in the exposed area, like what is known as a “twisted pair” arrangement. The wire elements 2 which are each twisted together in the exposed area are inserted into a terminal sleeve 16 in pairs.

Figure 16:
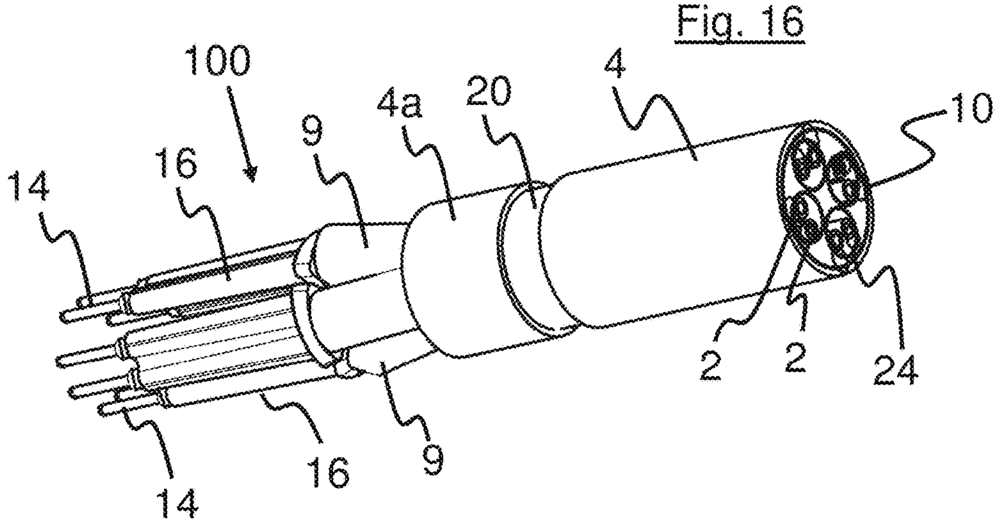
FIG. 16 shows an alternative embodiment of a connector with second wire element sheaths.

FIG. 16 shows yet another alternative embodiment to that of FIGS. 14 and 15, which may optionally also be equipped cumulatively, with FIG. 16 illustrating second wire element sheaths 9 in the exposed area, with the wire elements 2 arranged in pairs and inserted into second wire element sheaths 9 in pairs. The second wire element sheaths 9 in particular consist of a piece of heat-shrink tube or an electrically insulating material.

Figure 17:
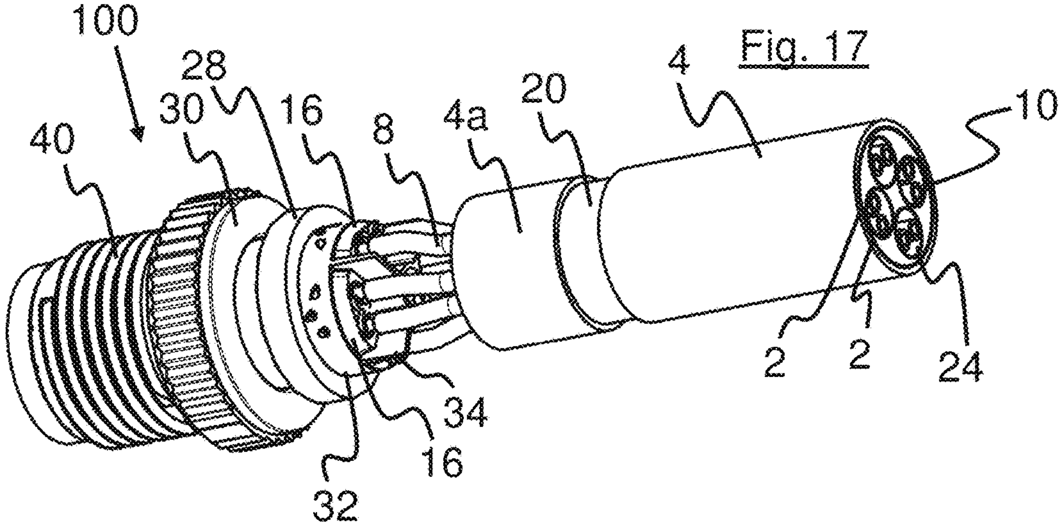
FIG. 17 shows a connector with connector housing.

FIG. 17 now shows the exemplary embodiment of FIG. 14 with the housing part 30 attached, which has been slid onto the wire elements 2 or onto the terminal elements 14 from the front to such an extent that the ends or the passage openings 161, 162 of the terminal sleeves 16 are arranged in the respective shielding sector 33, for example below radial ring 32. Optionally, a small portion of the stripped conductor end 2*a* might even protrude from the terminal sleeves 16. This is not crucial since these areas will be covered later.

Figure 18:
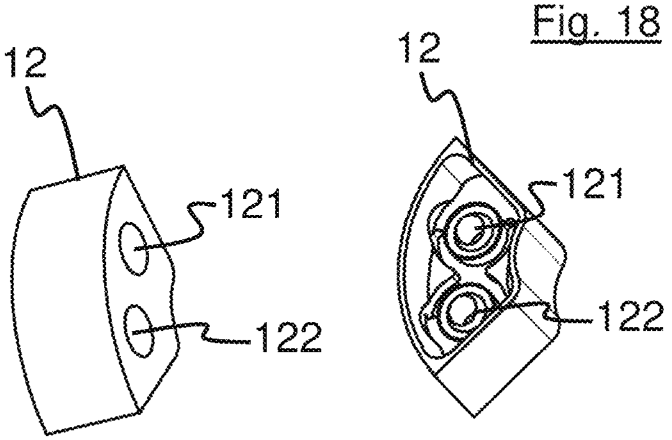
FIG. 18 shows one embodiment of a sealing element.
Figure 19:
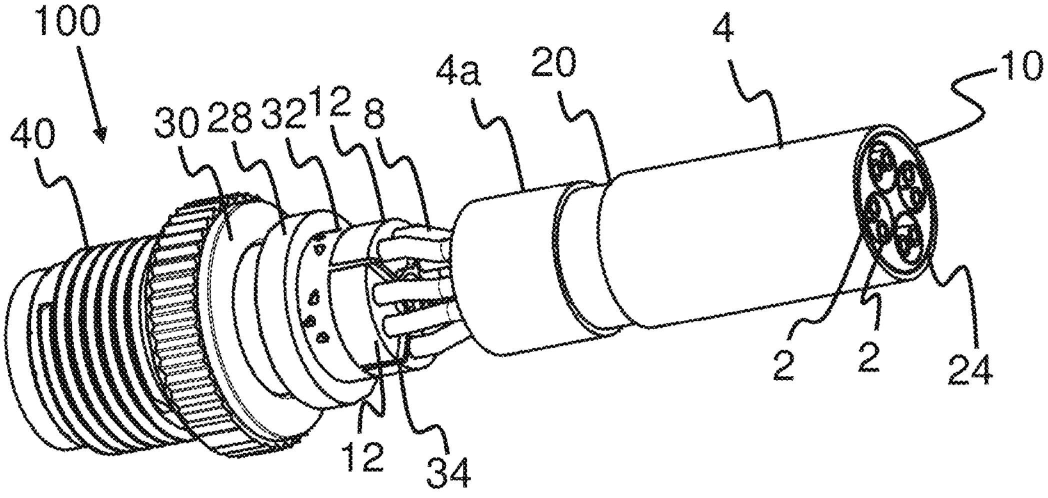
FIG. 19 shows the connector of FIG. 17 with sealing elements installed.

FIG. 18 shows an embodiment of a sealing insert 12 that is adapted for being inserted into a shielding sector 33 of the shield divider 35. The sealing insert 12 has first and second passage openings 121, 122 for extending wire elements 2 therethrough. In the embodiment illustrated in FIG. 18, these are two passage openings 121, 122, so that a pair of wire elements 2 can be extended through one sealing insert 12. In other words, one sealing insert 12 seals one pair of wire elements 2 in a media-tight manner. The plug-in connector 100 in its assembled form as shown in FIG. 19 can now be provided with the shielding bridge 25. The shielding bridge 25 is provided over a range that starts at the outer shielding sleeve 20 and extends over the portion of cable insulation 4*a*, the exposed wire element sheaths 8, the sealing inserts 12, the shield divider 35 and as far as to the sealing ring 28. This can be accomplished using a casting mold as shown in FIG. 7, for example.

Figure 20:
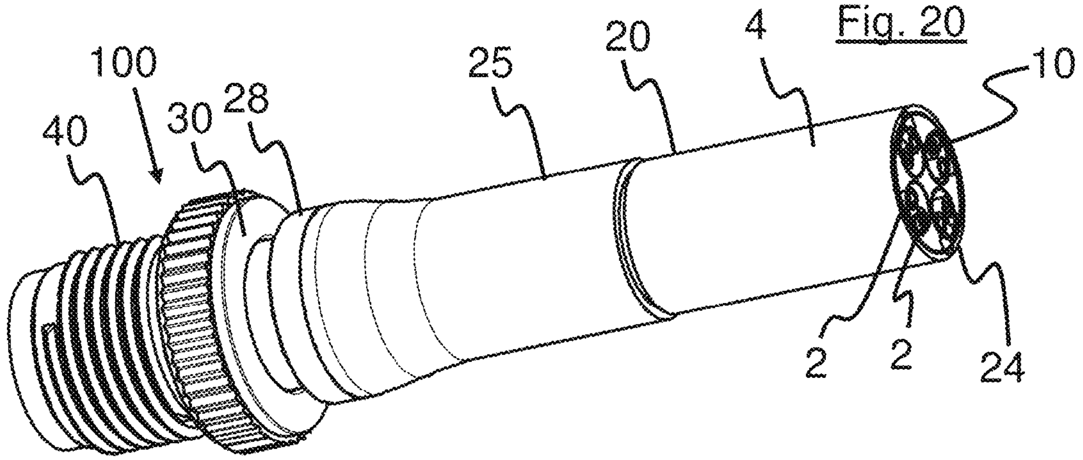
FIG. 20 shows the connector of FIG. 19 with overmolded shielding bridge.

FIG. 20 shows the plug-in connector 100 equipped with the shielding bridge 25 for establishing the shielding envelop, in particular a gapless shielding envelop extending from the outer shielding sleeve to the sealing ring 28, which is also electrically connected to the inner shielding sleeves 24 and by virtue of the shield divider 35 also extends in the interior between the wire elements 2. In this way, the intermediate shielding between the wire elements 2, in particular between each pair of wire elements 2 and the other wire elements 2, remains intact over the entire length of the plug-in connector 100 and also over the entire extension length of the wire elements 2 from the plug-in connector 100 to the cable 10. In fact, the material of the shielding bridge 25 flows in between the wire elements 2, since the shielding bridge 25 is cast directly onto the wire element sheaths 8, and flows there between the wire elements 8, 2. In other words, with the shielding bridge 25 applied, each wire element 2 will be radially surrounded from all sides by the material of the shielding bridge 25, i.e. in particular against the other wire elements 2 of the other wire element pairs. Furthermore, the shielding bridge 25 will also be electrically connected to the shield divider 35 and in particular to all shielding webs 34 of the shield divider 35. The shielding bridge 25 is connected to the shielding webs 34 of the shield divider 35 by a material bond. It is moreover preferred if the same material bond can also be produced to the outer shielding sleeve 20 and to the inner shielding sleeves 24, so that the shielding bridge 25 establishes a connecting bridge in the form of a material bond between the shield divider 35 via the shielding bridge 25 to the outer shielding sleeve 20 and the inner shielding sleeves 24.

Figure 21:
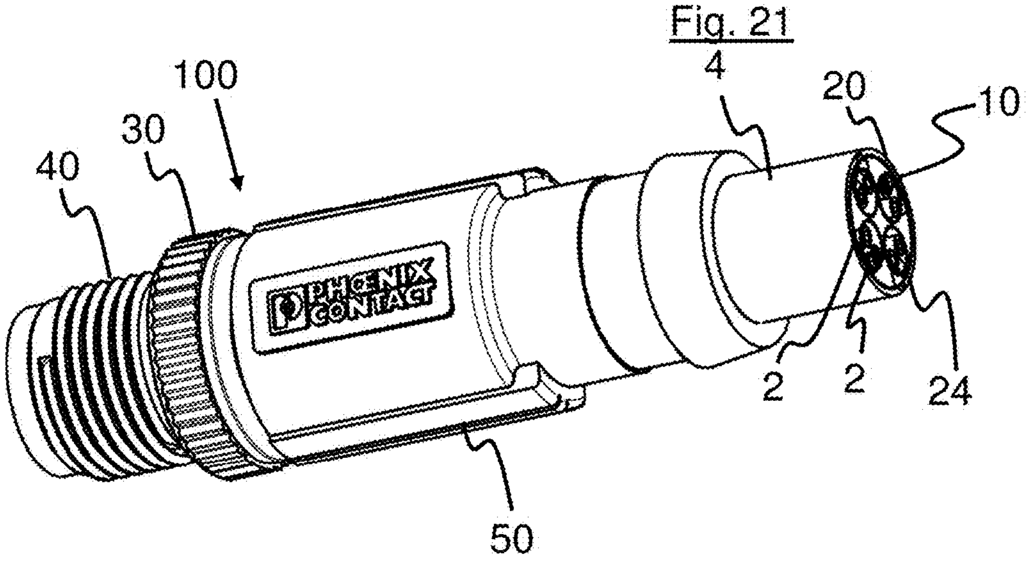
FIG. 21 shows the connector of FIG. 20 with a plastic contact protection jacket.

Finally, FIG. 21 shows the connector of FIG. 20, with a protective jacket 50 applied to the portion including the shielding bridge 25, for example by overmolding, as is customary commercially. Optionally, the protective jacket 50 can be clamped or crimped in order to secure it in its position on the cable 10 or to achieve strain relieve and/or media seal.

Figure 22:
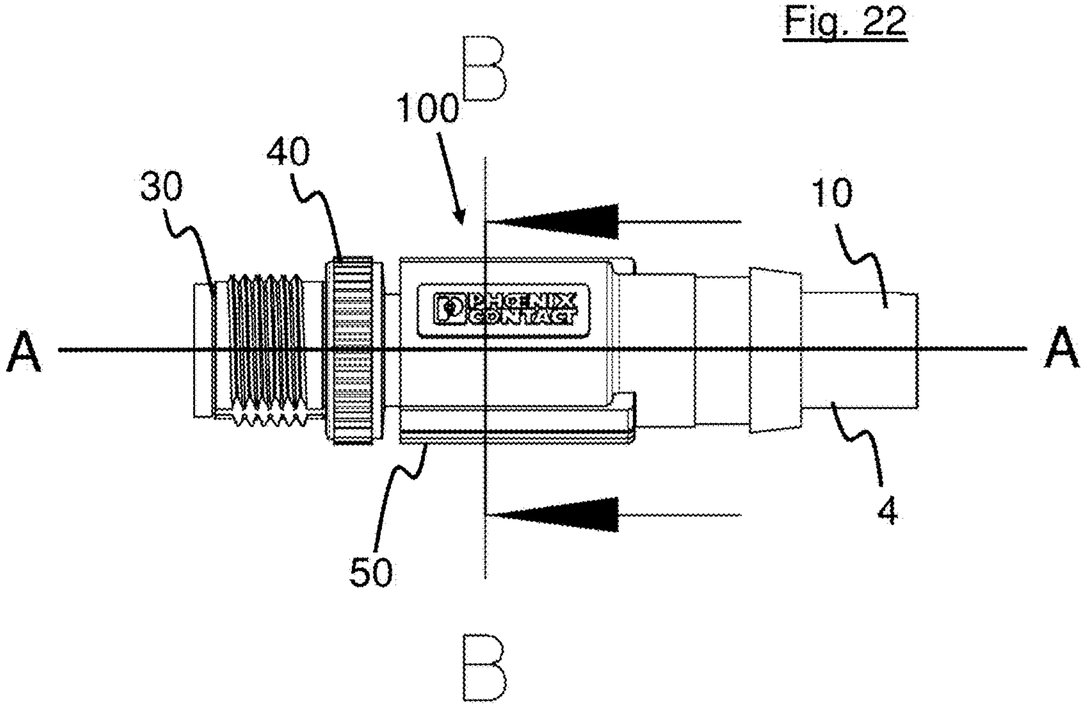
FIG. 22 is a side view of a connector.
Figure 23:
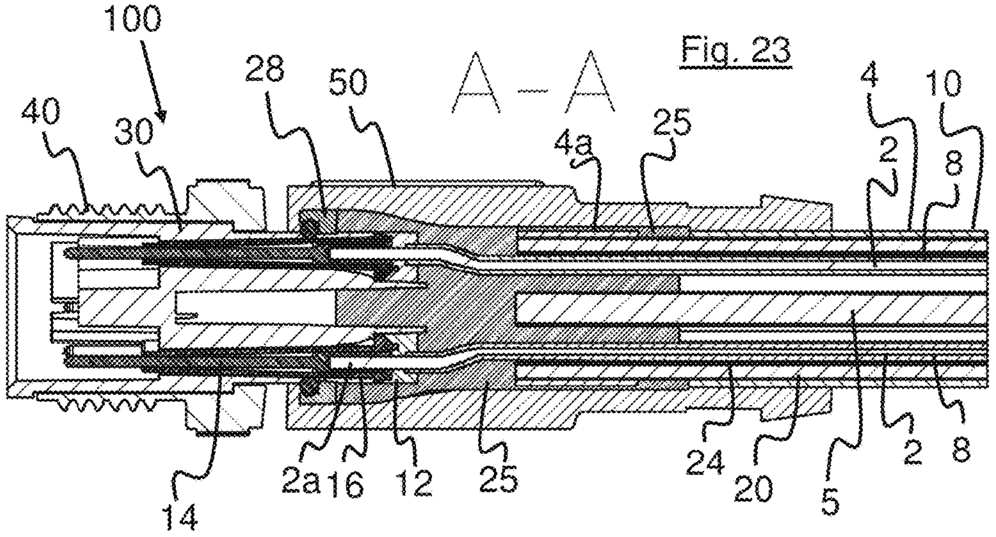
FIG. 23 is a sectional view through a connector.
Figure 24:
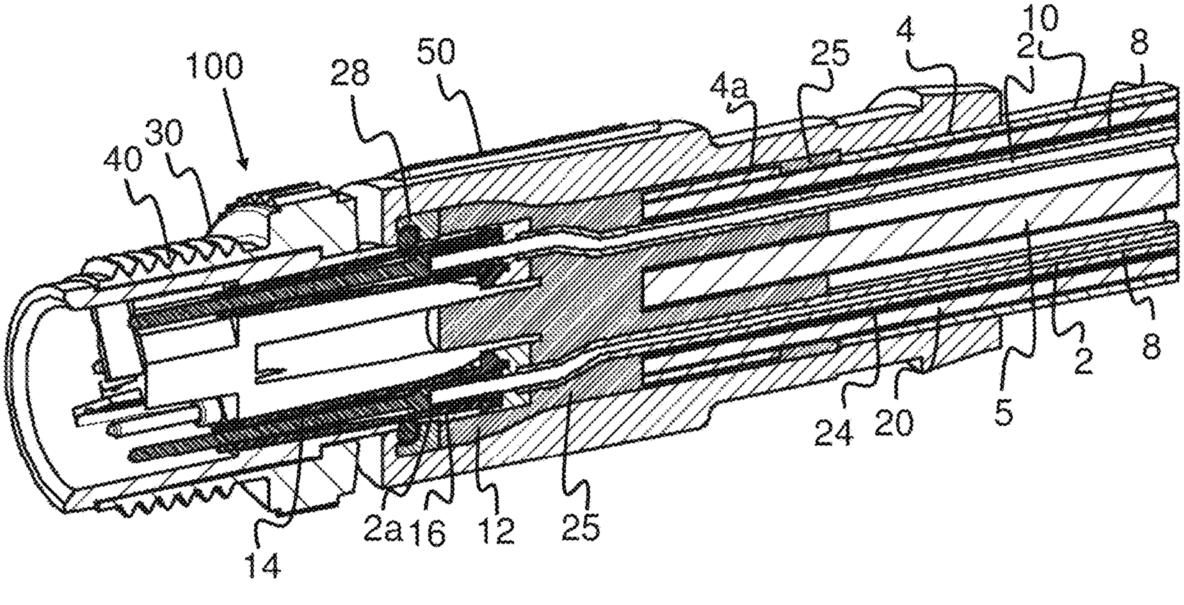
FIG. 24 is a perspective sectional view through a connector.
Figure 25:
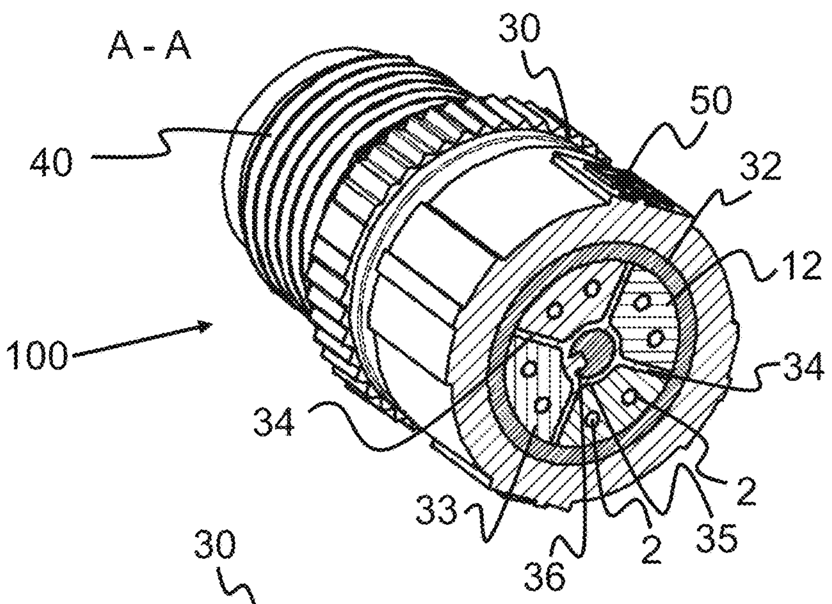
FIG. 25 is a cross-sectional view of an electrical connector.

FIG. 22 shows a top view of a plug-in connector 100 in its fully assembled state, with cutting lines A and B representing the lines along which the views of FIGS. 23, 24, and 25 have been taken. FIG. 23 shows a longitudinal sectional view along line A-A through a plug-in connector as indicated in FIG. 22. The plug-in connector 100 illustrated by FIG. 23 is shown in its final completed state, even with the protective jacket already applied. The longitudinal section of FIG. 23 clearly shows the profile of shielding bridge 25 which extends around the wire elements 2, between the wire elements 2 and beyond the section 4*a* of the cable insulation 4. The shielding bridge 25 establishes contact to the housing part 30, 32 by a material bond and thus entirely establishes the shielding bridge. In the interior, the shielding bridge 25 contacts the shield divider 35.

The cable has a cable core 5 which is used to improve the symmetry of the cable (in terms of RF properties), for example, and/or to stiffen the cable. In the example shown here, the cable includes the two wire elements 2 each of which is surrounded by a wire element sheath 8. An inner shielding sleeve 24 surrounds each wire element 2. In addition, the cable as a whole is shielded against the environment by the outer shielding sleeve 20. On the outside, the cable 10 comprises the cable insulation 4.

The stripped wire ends 2*a* of wire elements 2 are inserted into terminal members 14 and secured therein. Terminal sleeves 16 are arranged around the terminal members 14 for accommodating the terminal members 14. Within the area of shield divider 35, sealing inserts 12 are arranged in order to seal the terminal sleeves 16 and the plug-in connector side from the shielding bridge 25 and the cable side of the shield divider in a media-tight manner. The cable 10 as shown in FIG. 23 may also comprise a plurality of wire elements 2 which are not illustrated in the view of FIG. 23 due to the selected perspective.

FIG. 24 shows a further example of a plug-in connector 100 in the final completed state, with a plurality of eight wire elements 2 electrically connected to terminal members 14 inside the housing part 30. By way of example, two wire elements 2 are shown in sectional profile, each of the wire elements 2 being enclosed by a wire element sheath 8. The shielding bridge 25 has been overmolded in situ onto the wire elements 2 and their wire element sheaths 8, from cast metal material, in particular a low-melting metal alloy, so that the shielding bridge 25 preferably extends integrally, i.e. in one piece, radially all around each of the wire elements 2. Furthermore, the shielding bridge 25 contacts both the outer shielding sleeve 20 and the inner shielding sleeve 24 in order to electrically connect both or all shielding sleeves 20, 24 with the shielding contacts 28, 35 of the housing part 30 of the plug-in connector 100. Here, the shielding effect for the wires is in particular also maintained completely and in an uninterrupted manner between the pairs of wire elements 2.

FIG. 25 shows a radial sectional view along section line A-A as indicated in FIG. 22. Within the area of shield divider 35, the wire elements 2 are extended through four sealing inserts 12, and each shielding sector 33 has a respective sealing insert 12 arranged therein. Coding means 36 indicates the correct orientation of the wire elements 2 in the housing part 30 during assembly.

Figure 26:
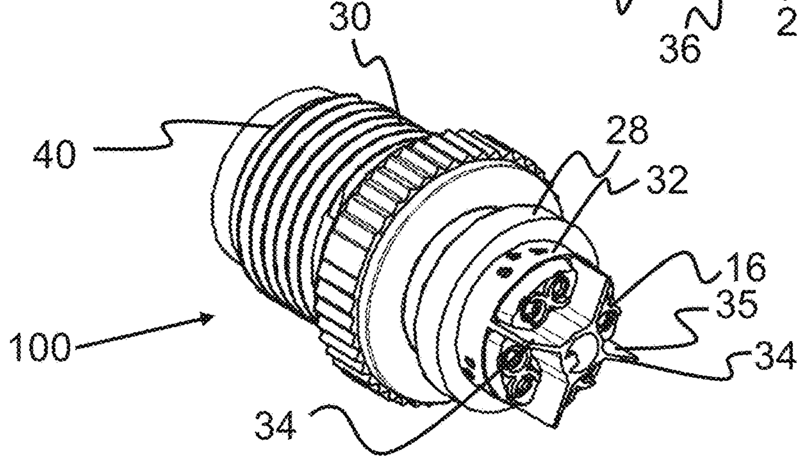
FIG. 26 is a perspective view of a connector housing.

FIG. 26 shows an embodiment of the housing part 30 of plug-in connector 100, where the terminal sleeves 16 are arranged in the area of shielding sectors 33 of the shield divider 35. The terminal sleeves 16 extend through the housing part 30 to end just before the mating face 18 (see FIG. 31). For example, the housing part 30 can be provided in this partially assembled form with preassembled terminal sleeves 16 for further assembly of the plug-in connector, so that the wire elements 2 equipped with terminal members can be introduced into the terminal sleeves 16 and thus also into the housing part 30.

Figure 27:
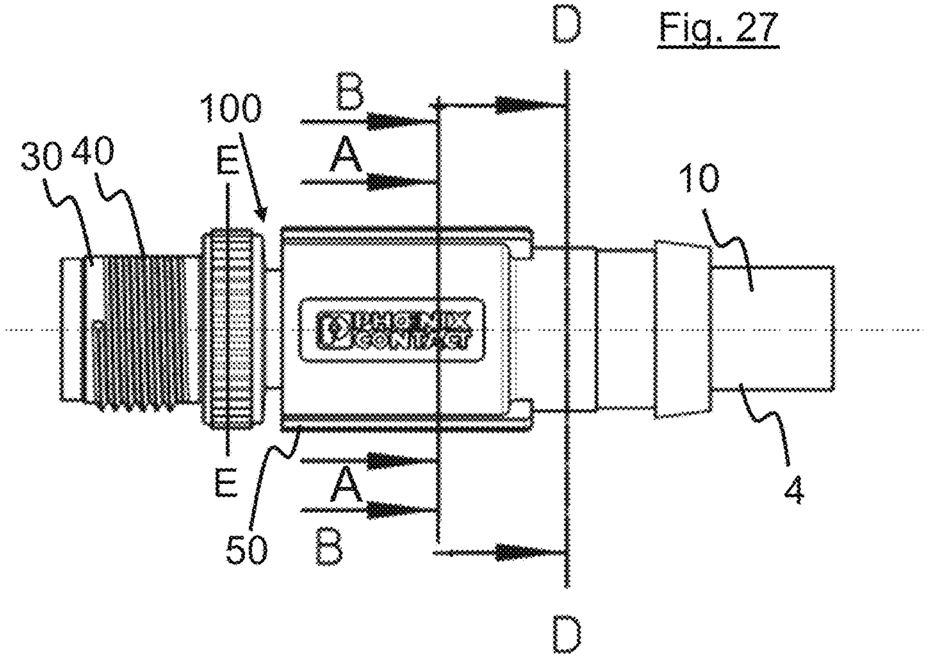
FIG. 27 is a top view of a connector.

FIG. 27 shows a side view of a plug-in connector 100 in its final completed state, with cutting lines A, B, and D indicated, along which the sectional views of FIGS. 27*a*, 27*b*, 27*c* as illustrated below have been taken, as well as the front view E shown in FIG. 30.

Figure 27A:
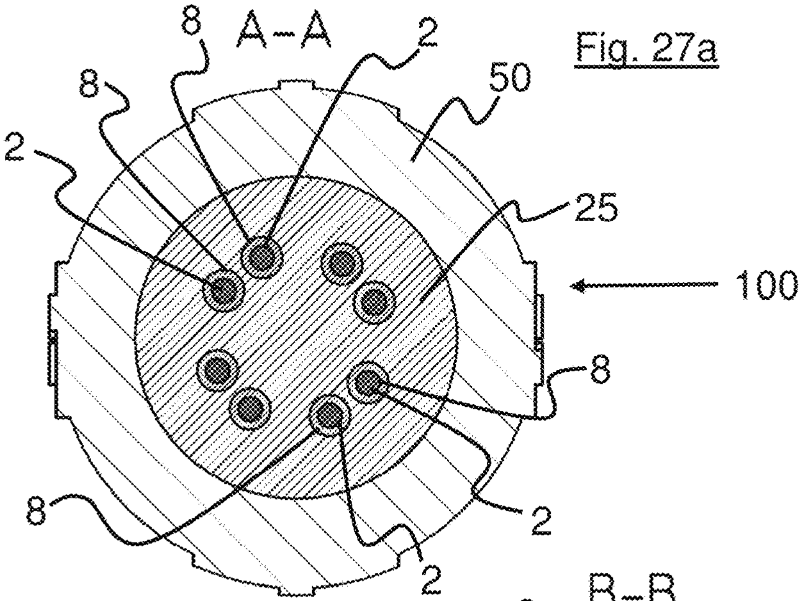
FIG. 27*a* is a longitudinal sectional view through a connector.

FIG. 27*a* shows a radial sectional view along cutting line A-A as indicated in FIG. 27, i.e. cut through the shielding bridge 25 in an area where all the wire elements are radially enclosed all around even individually, that is even between each pair of wire elements, as well as between the pairs of wire elements 2 and the other pairs of wire elements 2. In this area, the wire elements 2 are each surrounded by wire element sheaths 8 in an electrically insulating manner. The wire elements 2 therefore do not have an electrical shielding insert 25.

Figure 27B:
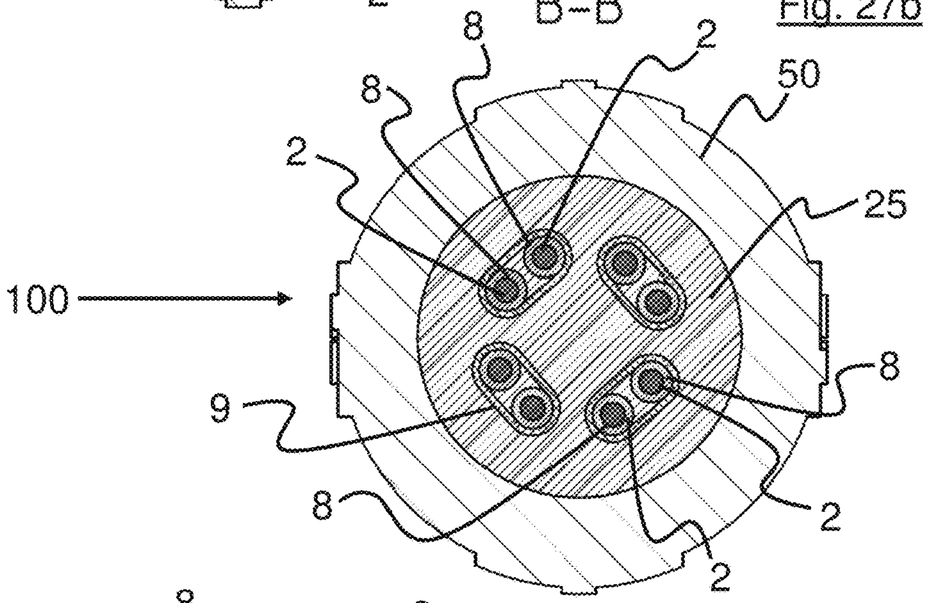
FIG. 27*b* is another longitudinal sectional view through a connector comprising second wire element sheaths.

FIG. 27*b* shows an alternative embodiment to that of FIG. 27*a*, again illustrating a radial sectional view along cutting line B-B in the area of shielding bridge 25 of the plug-in connector 100, as shown in FIG. 27. Each pair of wire elements 2 is additionally enclosed by a second wire element sheath 9. Thus, considered from the inside out, a wire element 2 is first radially surrounded all around by the wire element sheath 8, then radially surrounded all around by the second wire element sheath 9, and on top of this it is surrounded by the shielding bridge 25, preferably radially all around. Depending on the embodiment, the area between a pair of wire elements 2, i.e. the space inside the second wire element sheath 9, is not filled by the shielding bridge 25. Anyhow, it will be obvious that even in this case each wire element 2 is preferably still radially surrounded by the shielding bridge 25 from all sides with respect to the outside. For example, the wire element 2 denoted at the top left in FIG. 27*b* is adjacent to its partner which is arranged inside the same second wire element sheath 9. This partner lies on an imaginary alignment line from wire element 2 to the next pair of wire elements 2. Nevertheless, there is material of the shielding bridge 25 between this wire element 2 and the next pair of wire elements 2 which is surrounded by a further second wire element sheath 9. Thus, material of the shielding bridge 25 is arranged around each wire element 2 in all radial directions. It is desirable that material of the shielding bridge 25 is arranged between each pair of wire elements 2 which is surrounded by a common second wire element sleeve 9, and the other pairs of wire elements 2 which are surrounded by further second wire element sheaths 9 and thus causes a shielding effect between the pairs of wire elements 2. Thus, the pairs of wire elements 2 are also shielded from one another.

Figure 27C:
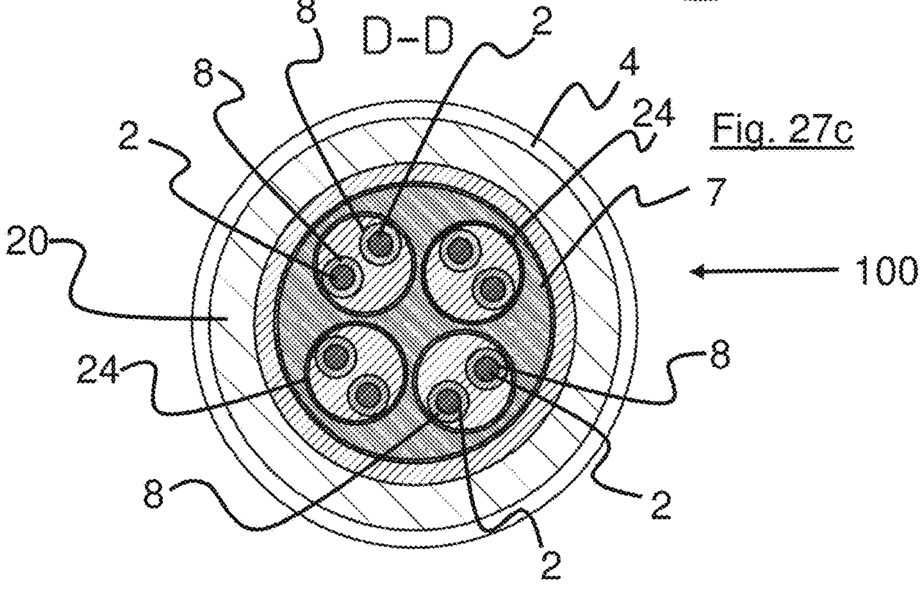
FIG. 27*c* is a cross-sectional view through a connector.

FIG. 27*c* shows a radial sectional view along section line D-D as indicated in FIG. 27, i.e. in the area of the cable 10. Each pair of wire elements 2 is shielded from the other pairs of wire elements 2 by an inner shielding sleeve 24. Furthermore, the outer shielding sleeve 20 surrounds all wire elements 2 together. The wire pairs which are arranged in an inner shielding sleeve 24 in each case, are embedded in and thus fixed by cable filling material such as cable rubber. The inner shielding sleeve 24 may be a thin aluminum foil, for example, or a plastic film with aluminum or another metal material vapor-deposited thereon. Metal material is preferred for shielding, here. If the inner shielding sleeve 24 and/or the outer shielding sleeve 20 is made of a metallic material or comprises a metallic material, it is possible to produce a material bond with the shielding bridge 25.

Figure 28:
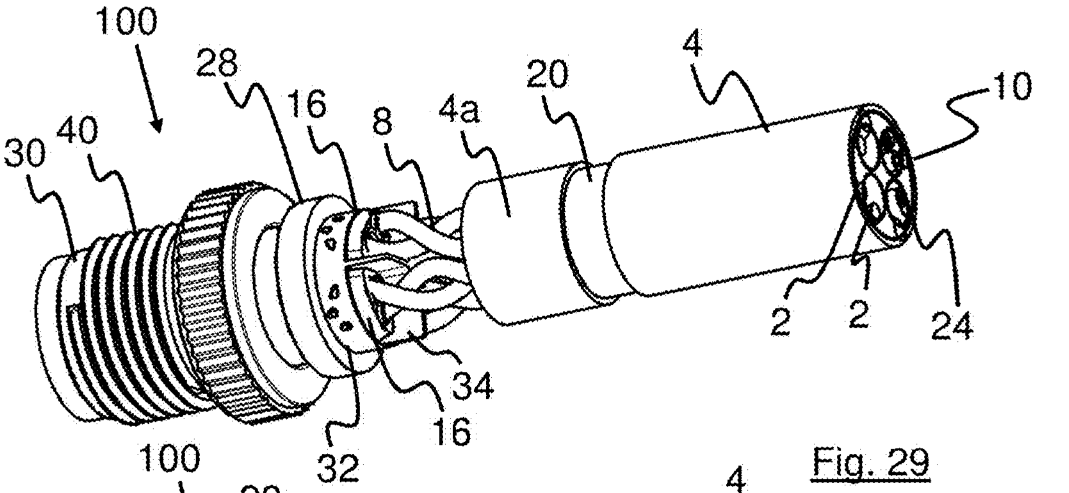
FIG. 28 is a perspective view of a connector with crossed wire elements.

FIG. 28 shows a further alternative embodiment of a partially assembled plug-in connector 100, with the wire elements 2 twisted in the area that is still exposed and inserted into the terminal sleeves 16.

Figure 29:
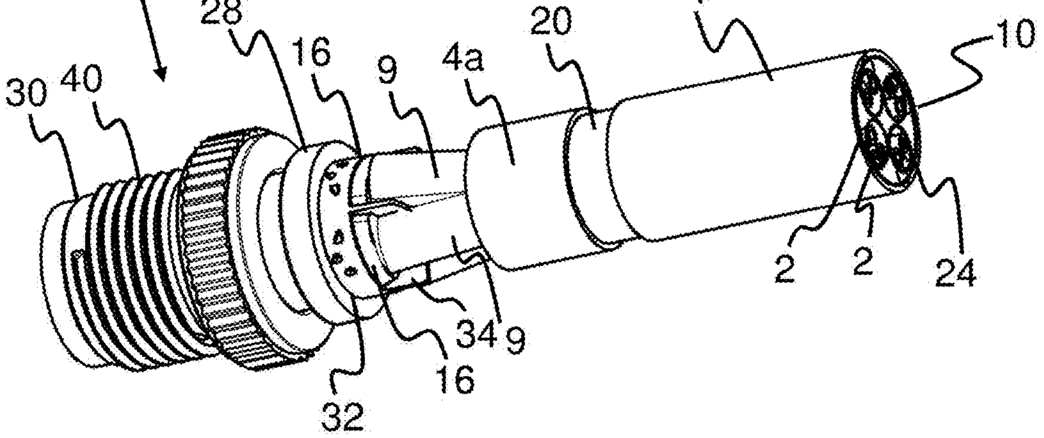
FIG. 29 is a perspective view of a connector with second wire element sheaths.

FIG. 29 shows yet another alternative embodiment of the partially assembled plug-in connector 100, with the respective pairs of wire elements 2 each provided with a second wire element sleeve 9 such as a shrink tube.

Figure 30:
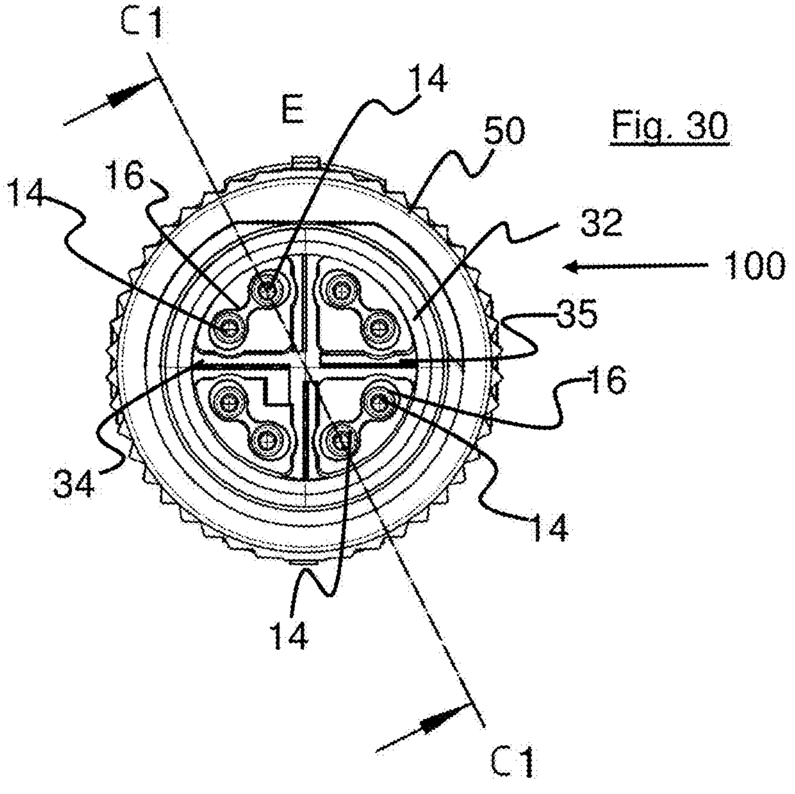
FIG. 30 is a front view of the mating face of a connector.

FIG. 30 shows a front view of a plug-in connector 100, as seen along cutting line E-E in FIG. 27. This radial sectional view is arranged inside the housing part 30 so that the radial sectional view cuts through the terminal sleeves 16 and the shield divider 35. The terminal members 14 are arranged inside the terminal sleeves 16. Furthermore, section line C1 is shown in FIG. 30 indicating the longitudinal sectional view of FIG. 31.

Figure 31:
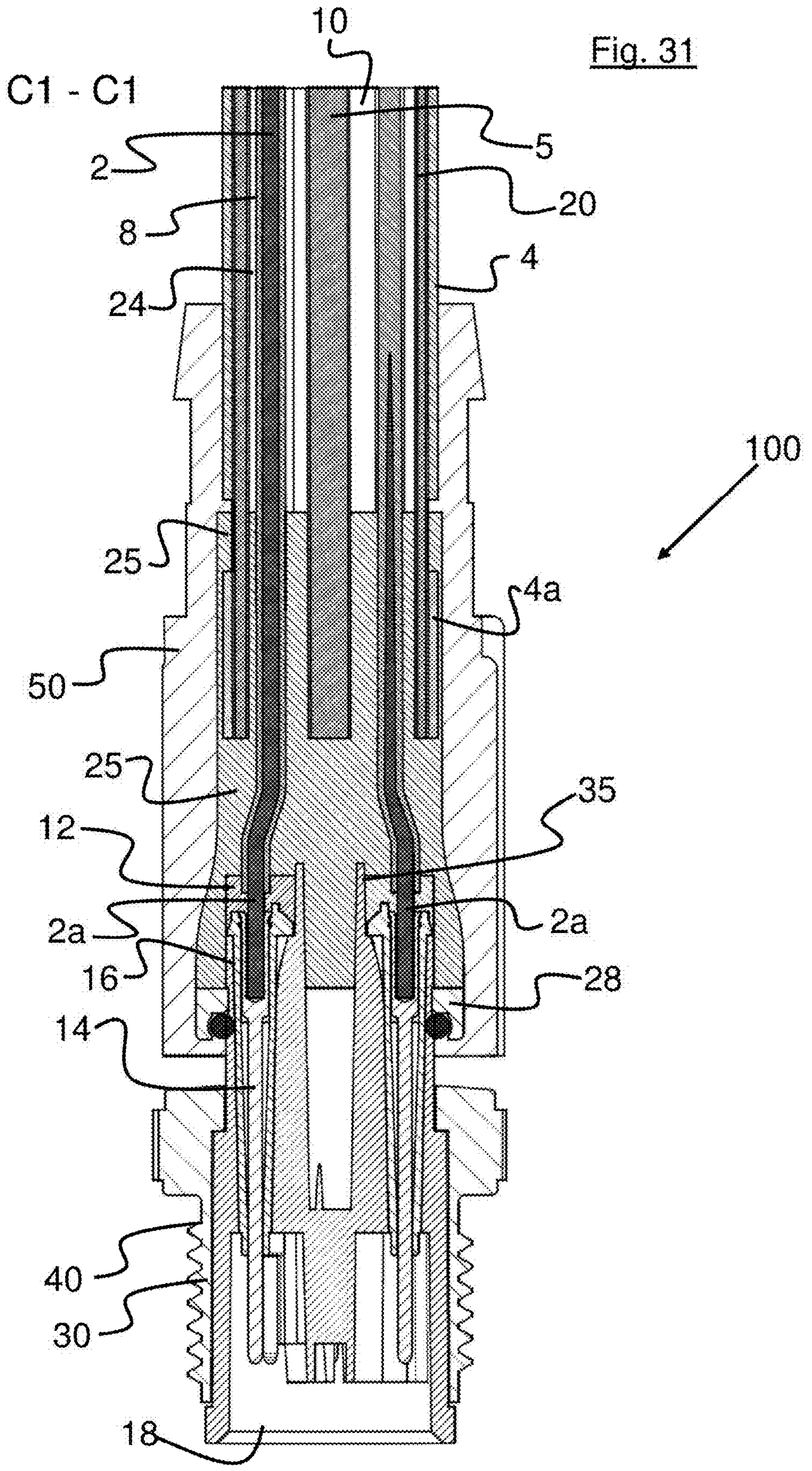
FIG. 31 is a longitudinal sectional view through a connector.

FIG. 31 shows a longitudinal sectional view along cutting line C1-C1 of FIG. 30 through a final completed plug-in connector 100. The cable 10 comprises a plurality of wire elements 2 which are introduced into contact elements 14 in the housing part 30. The shielding bridge 25 surrounds the wire elements 2 in the connection area between cable 10 and housing part 30, preferably radially all around, that is between the wire elements 2 as well. Here, the shielding bridge 25 extends from an exposed area between portion 4*a* of the cable insulation and cable insulation 4 on the side of the cable as far as to the contact ring 28 of the housing part on the side of the housing and thereby makes contact with the shield divider 35 as well as the inner shielding sleeves 24 and the outer shielding sleeve 20.

Figure 32:
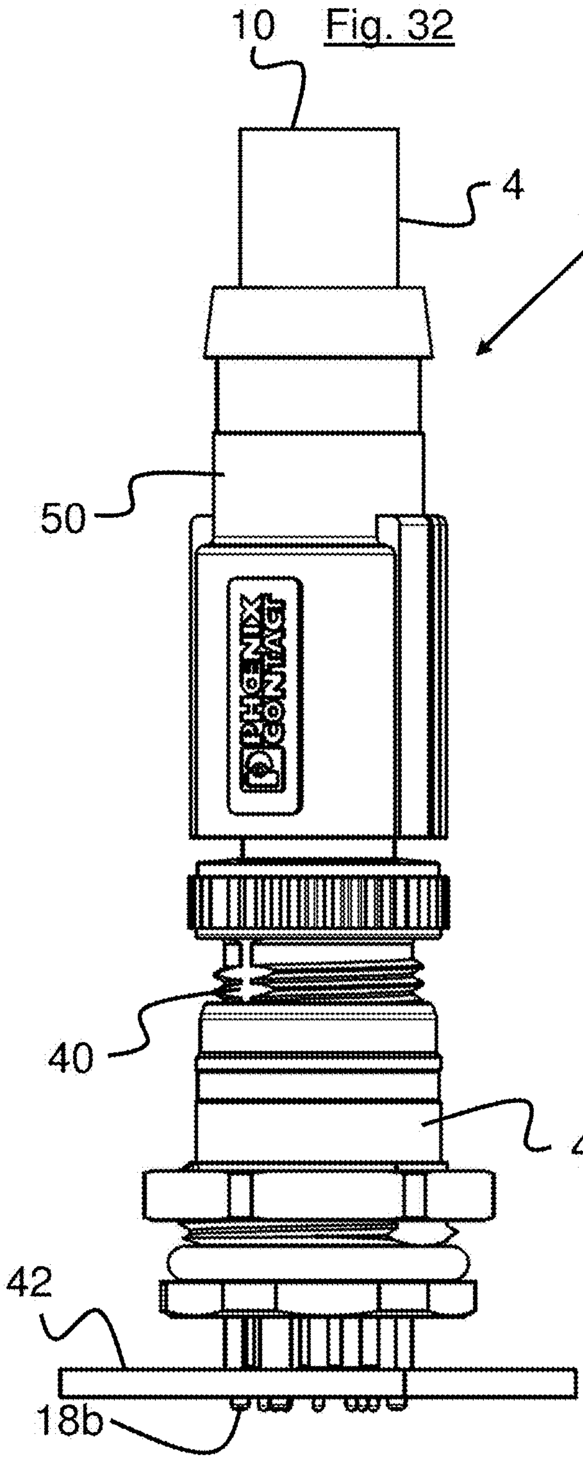
FIG. 32 is a side view of a connector with a printed circuit board.

FIG. 32 shows an embodiment of the final completed plug-in connector 100 which is screwed into a mounting part 44 that comprises a printed circuit board or mounting board 42.

Figure 33:
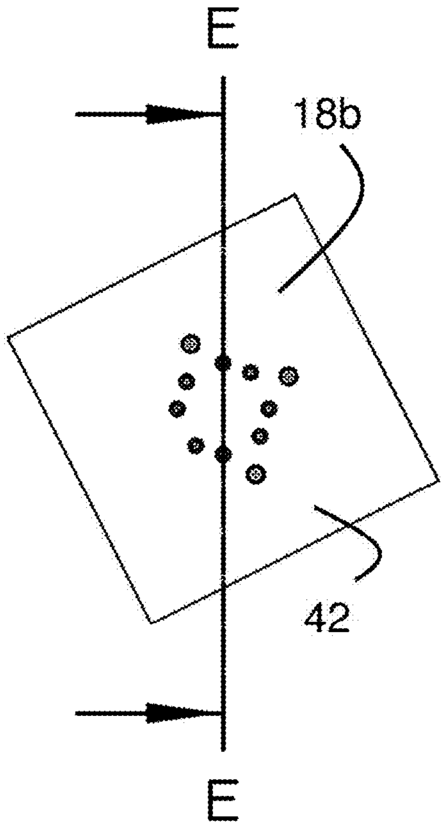
FIG. 33 is a top plan view of the mating face of a printed circuit board of a connector.

For this case, FIG. 33 shows a view of the mating face 18*b* of mounting part 44. The mating face 18*b* is provided on a printed circuit board or mounting board 42.

Figure 34:
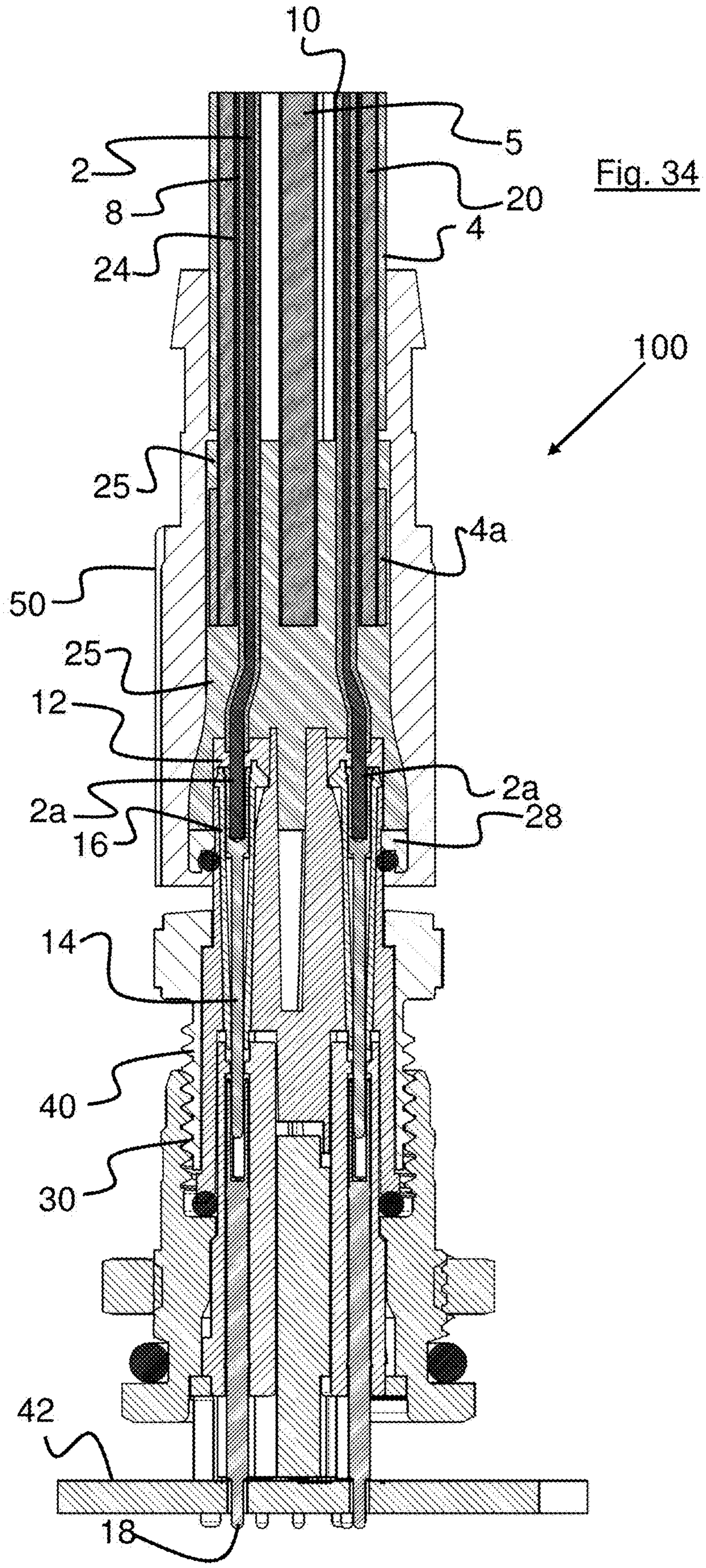
FIG. 34 is a longitudinal sectional view through a connector with a printed circuit board.

Finally, FIG. 34 shows a longitudinal sectional view through the connector 100 according to FIG. 32 with the mounting part 44 assembled thereto.

The present disclosure thus described a plug-in connector 100 in which a complete shielding of individual wires 2 of a cable 10 can be achieved not only by the outer shielding 20, but also a shielding between the individual pairs of wire elements 2, and this in a particularly cost-efficient and effective manner. Here, a shielding bridge is applied on the exposed area between cable 10 and housing part 30 in such a way that the shielding bridge 25 also extends between the individual wire elements 2 or at least between the pairs of wire elements 2, so that each wire element 2 is radially enclosed all around by material of the shielding bridge 25 in this area, that is in particular radially surrounded by the shielding bridge 25 from all sides. In this way, uninterrupted and complete shielding can be achieved to the outside with regard to the outer shielding and thus to the outer shielding sleeve 20 and at the same time also between the wire elements 2, i.e. to the inner shielding sleeve 24 of the respective pair of wire elements and to the shield divider 35 and the housing part 30, 32. For this purpose, an integral, i.e. one-piece shielding bridge is used, which also creates a non-releasable connection from the shielding elements 20, 24 of the cable 10 to the contact elements 28, 35 of the housing part 30. The non-releasable connection provided by the shielding bridge 25 is in particular a material bond, for example as produced by a soldering process. The shielding bridge 25 presented here is preferably cast in situ from a metallic material directly and immediately onto the wire element sheaths 8 and/or second wire element sheaths 9 in the illustrated annular portion.

It will be apparent to a person skilled in the art that the embodiments as described above are meant to be exemplary and that the present disclosure is not limited thereto but can rather be varied in many ways without departing from the scope of the claims. Furthermore, it will be apparent that irrespective of whether disclosed in the description, the claims, the figures, or otherwise, the features also individually define components of the present disclosure, even if they have been described together with other features. Throughout the figures, the same reference numerals designate the same pieces of subject-matter, so that a description of pieces of subject-matter that are possibly only mentioned in one or at least not in conjunction with all figures can also be transferred to such figures with regard to which the piece of subject-matter has not explicitly been described in the specification.

The invention claimed is:

1. A shielded electrical connector, comprising:

a plurality of wire elements;

a plurality of wire element sheaths electrically insulating the plurality of wire elements;

an outer electrically conductive shielding sleeve surrounding the plurality of wire elements at least partially or at least in sections thereof;

at least one inner electrically conductive shielding sleeve jointly surrounding a first subset of the plurality of wire elements at least partially or at least around portions thereof for shielding them from other wire elements of the plurality of wire elements;

a connector housing accommodating terminal members;

an electrically conductive shield divider defining at least a first and a second shielding sector, wherein the first subset of the plurality of wire elements is extended into the first shielding sector and a second subset of the plurality of wire elements is extended into the second shielding sector;

at least one sealing insert in one of the first or second shielding sectors sealing off a cable side from a connector side in an area of the electrically conductive shield divider; and an electrically conductive shielding bridge electrically connecting the outer electrically conductive shielding sleeve to the at least one inner electrically conductive shielding sleeve and to the electrically conductive shield divider.

2. The shielded electrical connector according to claim 1, wherein the plurality of wire elements form part of a cable or of a plug-in connector; and/or wherein the plurality of wire elements are electrically connected to a cable comprising a plug-in connector.

3. The shielded electrical connector according to claim 1, wherein the plurality of wire elements are provided in pairs of two wire elements per pair and wherein the inner electrically conductive shielding sleeves are adapted for shielding pairs of the wire elements from each other; and/or wherein the wire elements are provided in subsets of at least two wire elements per subset and wherein the electrically conductive inner shielding sleeves are adapted for shielding respective subsets of wire elements from each other.

4. The shielded electrical connector according to claim 1, wherein the electrically conductive shielding bridge establishes a non-releasable bond to the outer electrically conductive shielding sleeve, to the inner electrically conductive shielding sleeves, and to the electrically conductive shield divider, so that the electrically conductive shielding bridge forms a non-releasable connection between the inner and outer electrically conductive shielding sleeves and the electrically conductive shield divider.

5. The shielded electrical connector according to claim 1, wherein the electrically conductive shielding bridge also extends between the plurality of wire elements and seals or fills areas between the plurality of wire elements, so that the wire elements are surrounded by the shielding from all sides; and/or wherein the electrically conductive shielding bridge is arranged around the wire element sheaths.

6. The shielded electrical connector according to claim 4, wherein the electrically conductive shielding bridge is made in one piece; and/or wherein the electrically conductive shielding bridge is made of a metallic material.

7. The shielded electrical connector according to claim 1, wherein the electrically conductive shielding bridge is arranged directly and immediately adjoining the wire element sheaths or a second wire element sheaths of the plurality of wire elements.

8. The shielded electrical connector according to claim 1, wherein the electrically conductive shielding bridge is molded in situ around the wire element sheaths and between the plurality of wire elements by a metal casting process, so that the electrically conductive shielding bridge radially encloses the plurality of wire elements from all sides.

9. The shielded electrical connector according to the claim 1, wherein the electrically conductive shielding bridge is adapted to anchor the inner electrically conductive shielding sleeves and the outer electrically conductive shielding sleeve on the electrically conductive shield divider.

10. The shielded electrical connector according to claim 1, wherein the electrically conductive shield divider is electrically connected to the connector housing; and/or wherein the electrically conductive shield divider has at least two or three, or four shielding webs, with a shielding sector defined between each pair of shielding webs.

11. The shielded electrical connector according to claim 1, wherein the electrically conductive shielding bridge is made of a low-melting metallic material.

12. The shielded electrical connector according to claim 1, further comprising:

at least one second wire element sleeve which jointly encloses at least two wire elements, wherein the electrically conductive shielding bridge radially encloses the second wire element sleeves from all sides.

13. The shielded electrical connector according to claim 1, wherein the electrically conductive shield divider has at least four shielding webs which are arranged at equal angular distances to one another, with the shielding sector defined between shielding webs;

wherein a pair of two wire elements extends through each shielding sector, so that the electrically conductive shield divider shields the pairs of wire elements from one another; and wherein each shielding web of the electrically conductive shield divider is electrically connected and non-detachably bonded to the electrically conductive shielding bridge.

14. The shielded electrical connector according to claim 1, wherein the connector housing is made of die-cast zinc and is made integrally with the electrically conductive shield divider.

15. The shielded electrical connector according to claim 1, wherein the electrically conductive shield divider comprises an inner hollow element; and/or wherein the electrically conductive shield divider has a coding means, the coding means indicating a correct orientation of the plurality of wire elements in the connector, and wherein the coding means is arranged in the inner hollow element.

16. The shielded electrical connector according to claim 1, further comprising a plurality of the sealing inserts which are arranged radially around the electrically conductive shield divider, wherein the electrically conductive shield divider has at least two shielding webs, with the shielding sector defined between the shielding webs, and wherein each shielding sector has one sealing insert arranged therein.

17. The shielded electrical connector according to claim 1, wherein the connector housing comprises a radial shielding which at least partially encloses the electrically conductive shield divider externally.

18. The shielded electrical connector according to claim 17, wherein the sealing inserts are arranged between the electrically conductive shield divider and the radial shielding thereby electrically and fluid-tightly insulating the cable side from the connector side in an annular portion.

19. The shielded electrical connector according to claim 1, wherein the sealing inserts are made of plastics material and each sealing insert has at least two passage openings for extending therethrough wire ends of the plurality of wire elements and/or the terminal members.

20. The shielded electrical connector according to claim 1, wherein the sealing inserts are made of potting compound which is cast in situ around at least two of the plurality of wire elements in each case in order to seal off the cable side from the connector side.

21. The shielded electrical connector according to claim 20, wherein the potting compound is epoxy resin or an adhesive material.

22. The shielded electrical connector according to claim 1, wherein the sealing inserts are produced using a shaping process.

23. A method for producing a shielded electrical connector, comprising the steps of:

exposing an outer electrically conductive shielding sleeve, inner electrically conductive shielding sleeves and wire element sheaths at one cable end to produce exposed outer and inner electrically conductive shielding sleeves and wire element sheaths;

connecting each one of wire elements with a respective terminal member;

arranging the wire elements and/or the terminal members in subsets, or in pairs as a pair of wires, in a respective shielding sector of an electrically conductive shield divider;

attaching or applying a sealing inserts on or around each subset of wire elements within an area of the electrically conductive shield divider; and applying an electrically conductive shielding bridge onto and between the wire elements and at the same time electrically connecting the exposed outer electrically conductive shielding sleeve, the exposed inner electrically conductive shielding sleeves, and the electrically conductive shield divider to the electrically conductive shielding bridge.

24. The method of claim 23, wherein the electrically conductive shielding bridge is applied onto and radially all around the wire element sheaths of the wire elements or around second wire element sheaths.

25. The method of claim 24, wherein the electrically conductive shielding bridge is made from liquid metal which is cast in situ onto the wire element sheaths or the second wire element sheaths and between the wire elements and in situ solidifies to form the electrically conductive shielding bridge.

26. The method of claim 23, wherein the step of applying the electrically conductive shielding bridge provides a non-detachable connection comprising material bonding with the exposed outer electrically conductive shielding sleeve, the exposed inner electrically conductive shielding sleeves, and the electrically conductive shield divider.

27. The method of claim 23, wherein the step of applying the electrically conductive shielding bridge comprises:

placing the wire elements with terminal members in a casting mold; and closing the casting mold and filling the casting mold with liquid metallic material to in situ produce the electrically conductive shielding bridge around and between the wire elements of the shielded electrical connector.

* * * * *